(12) United States Patent
Yamaura et al.

(10) Patent No.: US 7,782,750 B2
(45) Date of Patent: Aug. 24, 2010

(54) RADIO COMMUNICATION METHOD, RADIO COMMUNICATION SYSTEM, RADIO COMMUNICATION BASE STATION, RADIO COMMUNICATION TERMINAL STATION, AND RADIO COMMUNICATION PROGRAM

(75) Inventors: Tomoya Yamaura, Tokyo (JP);
Kazuyuki Sakoda, Tokyo (JP);
Yasunori Maeshima, Tokyo (JP);
Hidemasa Yoshida, Chiba (JP)

(73) Assignee: Sony Corporation, Tokyo (JP)

( * ) Notice: Subject to any disclaimer, the term of this patent is extended or adjusted under 35 U.S.C. 154(b) by 2080 days.

(21) Appl. No.: 10/368,612

(22) Filed: Feb. 20, 2003

(65) Prior Publication Data
US 2003/0224731 A1   Dec. 4, 2003

(30) Foreign Application Priority Data
Feb. 21, 2002 (JP) ............................... 2002-045233

(51) Int. Cl.
*H04J 11/00* (2006.01)
(52) U.S. Cl. ...................... 370/206; 370/208; 455/63.3
(58) Field of Classification Search ................ 370/206, 370/208; 455/63.3; 375/343
See application file for complete search history.

(56) References Cited

U.S. PATENT DOCUMENTS 6,298,035 B1 * 10/2001 Heiskala ...................... 370/206
6,442,220 B1 *  8/2002 Sihlbom ...................... 375/343

FOREIGN PATENT DOCUMENTS

| JP | 7-202751 | 8/1995 |
|----|----------|--------|
| JP | 7-245574 | 9/1995 |
| JP | 10-247897 | 9/1998 |
| JP | 11-8604 | 1/1999 |
| JP | 2000-115834 | 4/2000 |
| JP | 2001-203664 | 7/2001 |
| JP | 2001-274767 | 10/2001 |
| JP | 2001-285181 | 10/2001 |
| JP | 2001-285927 | 10/2001 |

OTHER PUBLICATIONS

Patent Abstracts of Japan, JP 09-046307, Feb. 14, 1997.
Yasushi Yamao, et al., "Time diffusion M-ary code modulation and demodulation system suitable for slow speed digital signal transmission", Information and Communication Engineers National Convention Lecture Memoirs, Mar. 6, 1988, 3 pages.

* cited by examiner

*Primary Examiner*—Jayanti K Patel
*Assistant Examiner*—Jung Park
(74) *Attorney, Agent, or Firm*—Oblon, Spivak, McClelland, Maier & Neustadt, L.L.P.

(57) ABSTRACT

A radio communication method for exchanging information between a base station and a terminal station. The method includes: communicating the information between the base station and the terminal station by multi-carrier signals by OFDM modulation scheme including plural subcarriers within a bandwidth, communicating control signals in addition to the information between the base station and the terminal station, and wherein part of the control signals addressed to the terminal station from the base station is transmitted by one or more specific subcarriers in the bandwidth for the multi-carrier signals.

17 Claims, 25 Drawing Sheets

FIG. 11A TxBit=(000) 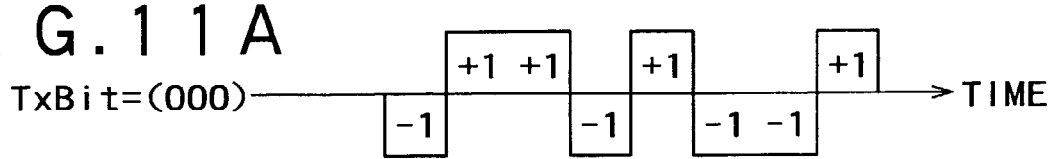
FIG. 11B TxBit=(001) 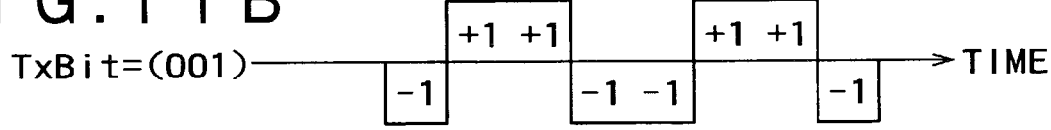
FIG. 11C TxBit=(010) 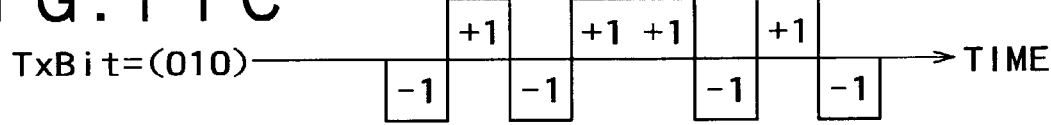
FIG. 11D TxBit=(011) 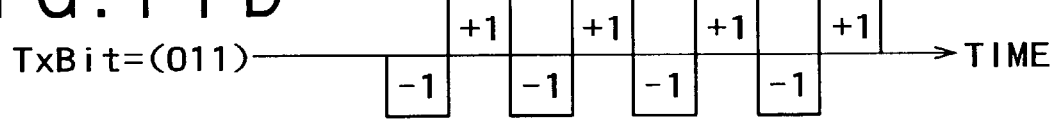
FIG. 11E TxBit=(100) 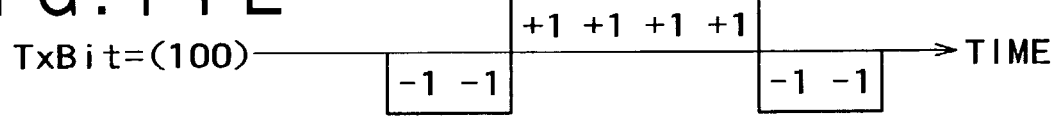
FIG. 11F TxBit=(101) 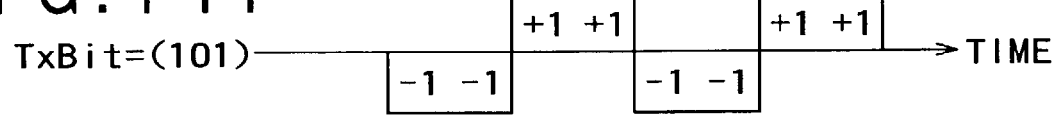
FIG. 11G TxBit=(110) 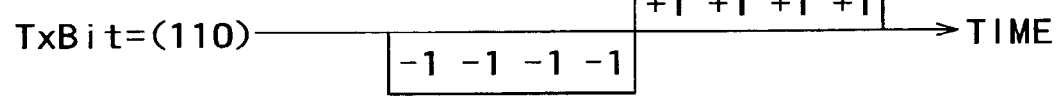
FIG. 11H TxBit=(111) 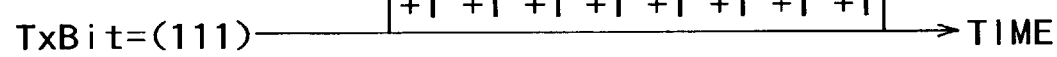

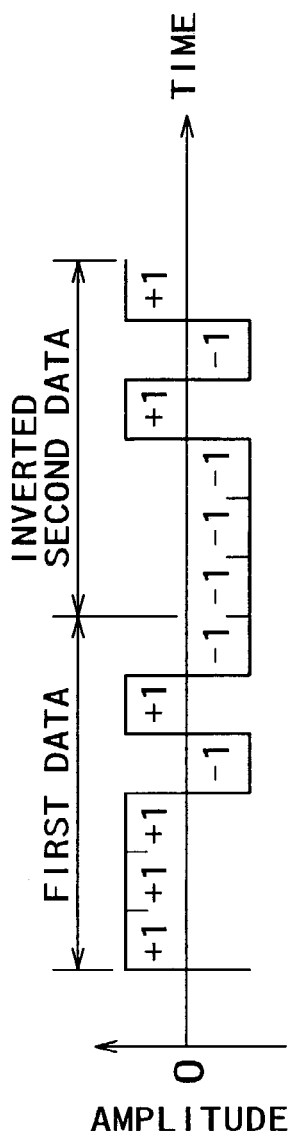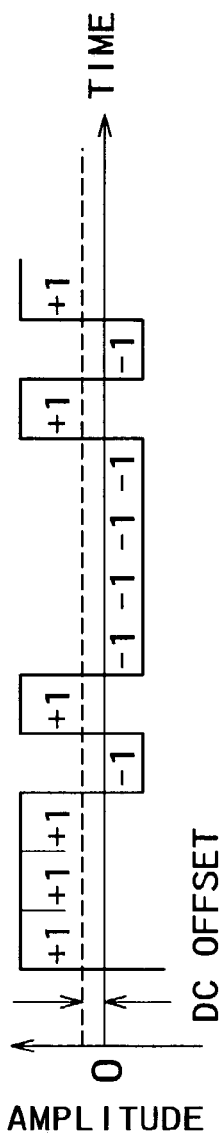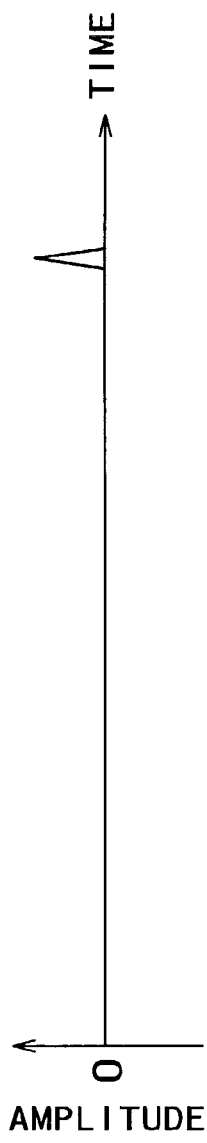
FIG. 13A WAVEFORM AT TRANSMITTING SIDE AND STANDARD WAVEFORM IN RECEIVER
FIG. 13B WAVEFORM AT RECEIVING SIDE, WITH DETERIORATING FACTOR (SUCH AS TRANSMISSION LINE DISTORTION) IGNORED
FIG. 13C CROSS CORRELATION WAVEFORM AT RECEIVING SIDE

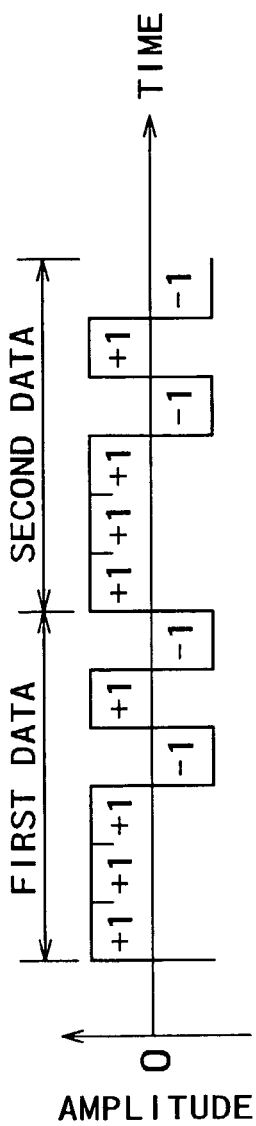
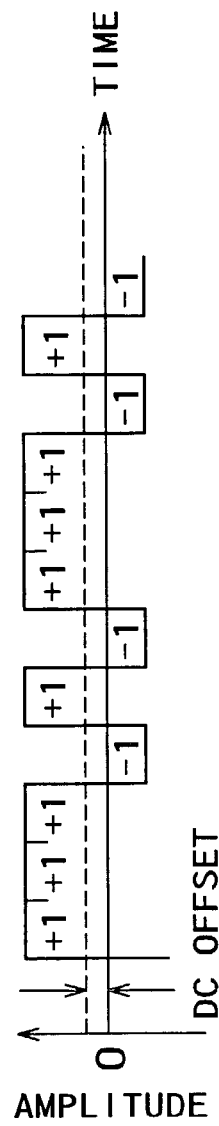
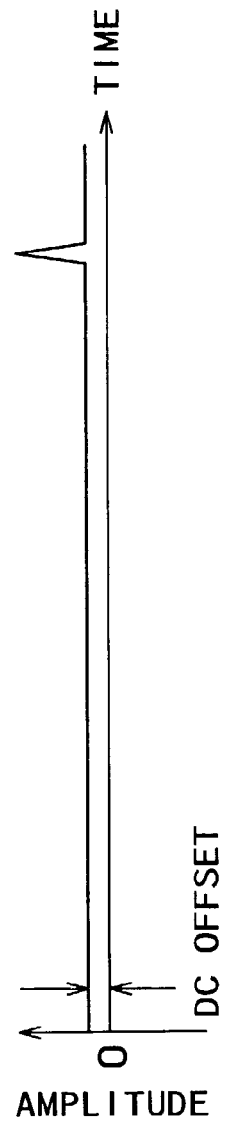
FIG. 14A WAVEFORM AT TRANSMITTING SIDE AND STANDARD WAVEFORM IN RECEIVER
FIG. 14B WAVEFORM AT RECEIVING SIDE, WITH DETERIORATING FACTOR (SUCH AS TRANSMISSION LINE DISTORTION) IGNORED
FIG. 14C CROSS CORRELATION WAVEFORM AT RECEIVING SIDE

RADIO COMMUNICATION METHOD, RADIO COMMUNICATION SYSTEM, RADIO COMMUNICATION BASE STATION, RADIO COMMUNICATION TERMINAL STATION, AND RADIO COMMUNICATION PROGRAM

BACKGROUND OF THE INVENTION

1. Field of the Invention

The present invention relates to a radio communication method, a radio communication system, a radio communication base station, a radio communication terminal station, and a radio communication program to be installed in equipment constituting said system, all of which are suitably applicable to the radio communication system for data communication. According to the present invention, they are particularly suitable for radio transmission based on OFDM modulation (Orthogonal Frequency Division Multiplexing).

2. Description of the Related Art

Attempts are being made to use for public multi-cell service the radio communication system which has originally been developed for the wireless LAN system to perform information transmission by means of OFDM modulation. OFDM modulation is a multi-carrier modulation scheme, in which one transmission channel available is divided into a plurality of subcarriers which are individually modulated with information to be transmitted. The radio communication system that employs OFDM modulation has good multi-path resistance and is suitable for mobile high-speed data communication because of its property that the duration of one OFDM symbol is longer than the delay time of multi-path delayed waves in mobile radio communication.

FIG. 29 is a diagram showing the arrangement of carries in the conventional radio communication system. This arrangement accords to the scheme called HiSWANa. According to this scheme, the frequencies of the center carrier are 5.17 GHz, 5.19 GHz, 5.21 GHz, and 5.23 GHz, and a signal band of 20 MHz (including a guard band) is assigned to each carrier.

FIG. 30 is a diagram showing the arrangement of subcarriers of one transmission channel in the conventional radio communication system. In each 20 MHz band shown in FIG. 29 are arranged the subcarriers, which have been generated by OFDM modulation, at intervals of 312.5 KHz. There are 53 subcarriers in total for information transmission. Of these 53 subcarriers, the subcarrier at the center (or the subcarrier centered at DC in the equivalent base band) is a null carrier which does not transmit information. (It corresponds to the subcarrier with a center frequency f0 in the carrier frequency band.) The frequency band used for information transmission is 16.5625 MHz, and both sides of the band are isolated from adjacent carriers by a guard band of about 1.7 MHz. This guard band is not used for information transmission.

FIG. 31 is a diagram showing an example of the format used to transmit control signals in the conventional radio communication system. In this system, the MAC frame is defined, which is a transmitting-receiving unit having a period of 2 ms. One radio frame has a length of 2 ms, and it is composed of four sections: broadcast burst, down-link phase, up-link phase, and contention phase. Incidentally, FIG. 31 shows only the broadcast burst and down-link phase, and the down-link phase is shown as down-link burst payload (DL burst payload).

The broadcast burst and down-link phase are sections for transmission from a base station to terminal stations. The broadcast burst is a section for transmission of control signals to all terminal stations under the control of the base station. The down-link phase is a section consisting mainly of a plurality of downbursts to transmit traffic data to each terminal station. The up-link phase and contention phase are sections for transmission from terminal stations to a base station. The broadcast burst includes broadcast preamble, BCH to transmit the base station information, FCH to transmit the allocation of traffic channel in the same frame to each terminal station, and ACH to reply to RCH used for calling from terminal stations.

The down-link phase includes SCH, which is a short traffic channel, and LCH, which is a long traffic channel. It is designed such that a plurality of SCH and/or LCH can jointly used for one mobile station in the period of down-link phase. This is called PDU (protocol data unit) train. The down-link preamble is attached to the head of each PDU train. One PDU train having a down-link preamble attached thereto is called down-link burst. In the period of up-link burst are contained SCH (which is a short traffic channel) and LCH (which is a long traffic channel). In the up-link, too, the PDU train is formed as in the case of down-link, and the up-link preamble is attached to the head of each PDU train. One PDU train having an up-link preamble attached thereto is called up-link burst. The contention phase contains RCH which is used for calling from mobile stations. To the head of each RCH is attached the up-link preamble to form the up-link burst.

The broadcast preamble has a length of 16 µs, and terminal stations receive this section to accomplish search of base stations, acquisition of initial synchronization, frame synchronization, frequency error correction, and symbol synchronization, after power has been turned on. The down-link preamble has a length of 8 µs, and terminal stations receive this section to accomplish more accurate timing correction, frequency error correction, and symbol synchronization. The up-link preamble has a length of 16 µs, and base stations receive this section to accomplish the timing correction, frequency error correction, and symbol synchronization for transmitting signals from terminal stations.

Such a system is constructed such that the terminal station calling signal is transmitted as traffic channel allocation information to each terminal station in FCH and the terminal station in the waiting mode waiting for being called judges whether or not it is called after it has received all of BCH and FCH in the broadcast burst.

Incidentally, there is another possible way of operation in which BCH and FCH in the broadcast burst in the head of all frames are not received but the frame intervals to be received by negotiation between a base station and a terminal station is thinned in order to increase the stand-by time in the terminal station.

FIG. 32 is a diagram showing the construction of a terminal station 300 in the ratio communication system that employs the conventional OFDM modulation. First, the construction of the transmission system will be explained step by step along the flow of signals. The data input/output processing unit 301 receives sound signals in the case of voice communication or data signals in the case of data communication by connection to a computer. It converts such signals into an adequate digital data string. The resulting output enters the transmitting data processing unit 311. If necessary, it receives from the control unit 302 communication control data to be transmitted to another OFDM radio equipment (base station), which is the called party of radio communication (not shown), and after multiplexing, it forms and outputs the frame and slot structure for transmission through the radio channel.

The output enters the CRC (Cyclic Redundancy Check) adding unit 312, for addition of redundancy to detect errors in the receiving end. The output from 312 enters the cipher unit 313. After encryption, the output from 313 enters the scrambler 314 in which scrambling is performed for pseudo randomization according to a prescribed algorithm. The output from 314 enters the encoding unit 315 in which error correction encoding is performed. There are several known methods for encoding, such as convolution coding, turbo coding, Reed-Solomon coding, and continuous coding (in which a plurality of coding methods are combined).

The output from the encoding unit 315 enters the interleaver 316, which performs interleaving (rearrangement of encoded bits according to a prescribed rule) so that the receiving end can convert burst errors into random errors by deinterleaving (reverse operation). The output from 316 enters the modulator 317, which, after mapping on the signal point at the time of transmission, outputs the in-phase component (I-component) and quadrature component (Q-component). The output from 317 enters the complex IFFT unit 318, which performs inverse fast Fourier transform for OFDM modulation.

The output from 318 enters the time waveform shaping unit 319, in which guard time is established by addition of cycleprefix and windowing is performed so as to smoothen the rise and fall of the OFDM modulation symbol. The output from 319 enters the DA converter 320, which performs conversion from digital waveform into analog waveform. The output from 320 enters the RF transmitter 321, which performs filtering, vector modulation for I-component and Q-component, frequency conversion into an adequate transmitting frequency channel, transmitting power control, and amplification.

The output from the RF transmitter 321 enters the antenna multiplexer 322. The output from 322 enters the antenna 323 to be eventually transmitted in the form of electromagnetic wave. The transmitted signals are received by another OFDM radio equipment (base station) which is the called party of radio communication (not shown). The antenna multiplex 323 is designed to separate transmitting signals and receiving signals from each other. Usually, an antenna switch is used for TDD system or FDD/TDMA system in which transmission and reception are accomplished in different timing, and a duplexer is used in other cases.

Next, the structure of the receiving system of the terminal station 300 will be explained. The signals which are received by the terminal station 300 are those which have been transmitted by the other OFDM radio equipment (base station) as the called party of radio communication (not shown). It is assumed that the transmitting signals have been formed by the same processing as in the terminal station 300 mentioned above.

The transmitting signal from the other OFDM radio equipment (base station) as the called party of radio communication (not shown) is received (in the form of electromagnetic wave) by the antenna 323. This signal is separated from the local transmitting signal by the antenna multiplexer 322, and the separated signal enters the RF receiver 331 which is the receiving circuit. The RF receiver 331 performs amplification, attenuation of undesired frequency components, selection of desired frequency channel, frequency conversion, level control of receiving signal amplitude, vector detection to separate I-component and Q-component from each other, and band limitation. It finally outputs I-component and Q-component. The output from the RF receiver 331 enters the AD converter 332, which performs conversion from analog waveform into digital waveform.

The output from 332 enters the synchronizing circuit 333, which performs frame synchronizing and frequency error correction. In the case where any party available for communication is searched immediately after power is turned on, the synchronizing circuit 333 performs synchronizing signal detection and initial synchronizing. The output from 333 enters the time waveform shaping unit 334, which performs time waveform shaping to remove guard time by addition of cycleprefix. The output from 334 enters the complex FFT unit 335, which performs fast Fourier transform for OFDM demodulation. The output from 335 enters the equalizer 336.

The equalizer 336 estimates the transmission line and performs equalization according to the result of estimate. In some cases, information from the synchronizing circuit 333 is also entered to the equalizer 336 to estimate the transmission line. The output from the equalizer 336 enters the demodulator 337, which performs signal point judgment and outputs the estimated value of received bit. The output from 337 enters the deinterleaver 338, which performs deinterleaving to rearrange the string of coded bits according to a prescribed rule. The output from 338 enters the decoder 339, which decodes the error correction code given by the transmitting end.

The output from 339 enters the descrambler 340, which performs descrambling as the inverse conversion of the scrambling performed in the transmitting end. The output from 340 enters the cipher remover 341, which removes cipher made by the transmitting end. The output from 341 enters the CRC checking unit 342, which outputs data from which CRC has been removed and the result of CRC checking of received blocks. The output from 342 enters the received data processing unit 343, which outputs data with the frame structure and slot structure (for transmission through the radio channel) removed, if it judges that there are no errors in the result of CRC checking of received blocks. The output from 343 enters the data input/output processing unit 301, which, after conversion, outputs sound signals in the case of voice communication or data signals in the case of data communication connected to a computer.

In the case where communication control data is contained which has been transmitted from the base station as the called party of radio communication (not shown), the received data processing unit 343 takes out that part, and the output enters the control unit 302 through the receiving system control line 304. The control unit interprets the received control data and controls the action of each unit of the terminal station 300 according to the instruction.

In the case where the ARQ (Automatic Request for Reception) system is employed, the received data processing unit 343 functions as follows. If the input signal from the CRC checking unit 342 contains information that the received block contains no errors, it outputs the received block to the received data processing unit 343 and also outputs to the control unit 302 through the receiving system control line 304, to the effect that the received block contains no errors. Upon receipt of this output, the control unit 302 instructs the transmitting data processing unit 311 through the transmitting system control line 303 to transmit ACK signal to the other OFDM radio equipment (base station) as the called party of radio communication (not shown). The transmitting data processing unit 311 sends ACK signal after performing multiplexing on the transmitting data. The ACK signal is transmitted to the base station by processing of the transmitting system as explained above.

Conversely, if the input signal from the CRC checking unit 342 contains information that the received block contains errors, it does not output the received block to the received data processing unit 343 but outputs to the control unit 302 through the receiving system control line 304, to the effect that the received block contains errors. Upon receipt of this output, the control unit 302 instructs the transmitting data processing unit 311 through the transmitting system control line 303 to transmit NAK signal to the base station as the called party of radio communication (not shown). The transmitting data processing unit 311 sends NAK signal after performing multiplexing on the transmitting data. The NAK signal is transmitted to the base station by processing of the transmitting system as explained above. Upon receipt of this transmission, the base station retransmits the block by which NAK signal has been transmitted.

In the case of stream communication, like voice communication, in which retransmission by the ARQ system is not employed, the received data processing unit 343 functions as follows. If the input signal from the CRC checking unit 342 contains information that the received block contains no errors, it outputs the received block to the received data processing unit 343 as mentioned above. Conversely, if the input signal from the CRC checking unit 342 contains information that the received block contains errors, the received data processing unit 343 discards the received block (handling it as erasure) and performs interpolation by using the received block before one block.

Each part of the transmitting system is connected to the control unit 302 through the transmitting system control line 303, and the control unit 302 controls and monitors various operations for the transmitting system through it (such as on-off of the transmitting system, control and monitor of the RF transmitter 321, fine adjustment of transmitting timing, change of the coding system and signal point mapping, and control of retransmitting). Each part of the receiving system is connected to the control unit 302 through the receiving system control line 304, and the control unit 302 controls and monitors various operations for the receiving system through it (such as on-off of the receiving system, control and monitor of the RF receiver 331, fine adjustment of receiving timing, change of the coding system and signal point mapping, and control of retransmitting).

The conventional OFDM communication system mentioned above works in such a way that the signal to call a terminal station from a base station is transmitted, with all information placed on subcarriers in the transmission band, and the called terminal station receives all the subcarriers to receive the calling signal. This means that the terminal station has to receive and decode the band signal (corresponding to 20 MHz) every 2 ms regardless of presence or absence of data being transmitted and received. It follows, therefore, that large quantities of signals have to be processed even when no information data is transmitted and received. This leads to a waste of batteries in the case where the terminal station is a battery-driven mobile station.

One known way to address this problem is to thin out the frame intervals to be received by negotiation between a base station and a terminal station, instead of receiving control signal frames in all MAC frames.

However, even in the case where the frame intervals to be received are thinned out, the frame period to be received needs reception in the same way as information transmission and reception. Therefore, loads in a terminal station are not so reduced by the above-mentioned way.

OBJECT AND SUMMARY OF THE INVENTION

The present invention was completed to reduce loads in a base station or a terminal station when control signals are transmitted from a base station to a terminal station in the radio communication system of the type mentioned above.

The first aspect of the present invention resides in a radio communication method for exchanging information between a base station and a terminal station by means of multi-carrier signals due to OFDM modulation scheme, wherein said radio communication method is characterized in that part of control signals addressed to a terminal station from a base station is transmitted by means of a carrier whose band is narrower than that for said multi-carrier signals, said carrier being arranged near the frequency band used for information transmission, in the case where there exist continuously a plurality of frequency bands used for information transmission.

The advantage of the first aspect of the present invention is that all that is necessary for a terminal station when it receives only part of control signals is to receive the narrow band carrier.

The second aspect of the present invention resides in a radio communication method for exchanging information between a base station and a terminal station by means of multi-carrier signals due to OFDM modulation scheme, wherein said radio communication method is characterized in that part of control signals addressed to a terminal station from a base station is transmitted by means of one or more specific subcarriers in the bandwidth for multi-carrier signals.

The advantage of the second aspect of the present invention is that all that is necessary for a terminal station when it receives only part of control signals is to receive one or more specific subcarriers in the bandwidth for multi-carrier signals.

The third aspect of the present invention resides in a radio communication method for exchanging information between a base station and a terminal station with a frame period by means of multi-carrier signals due to OFDM modulation scheme, wherein said radio communication method is characterized in that part of control signals addressed to a terminal station from a base station is transmitted at a specific position of the frame period.

The advantage of the third aspect of the present invention is that all that is necessary for a terminal station when it receives only part of control signals is to receive the specific position in the frame period.

BRIEF DESCRIPTION OF THE DRAWINGS

FIGS. 11A to 11H are diagrams showing an example of the M-ary coding to be applied to the present invention.

FIGS. 13A, 13B, 13C are diagrams illustrating an example of the processing for transmission of control signals with the DC offset removed.

FIGS. 14A, 14B, 14C are diagrams illustrating an example of the case in which the DC offset is not removed.

DESCRIPTION OF THE PREFERRED EMBODIMENTS

The first embodiment of the present invention will be described in more detail with reference to FIGS. 1 to 12.

Figure 1:
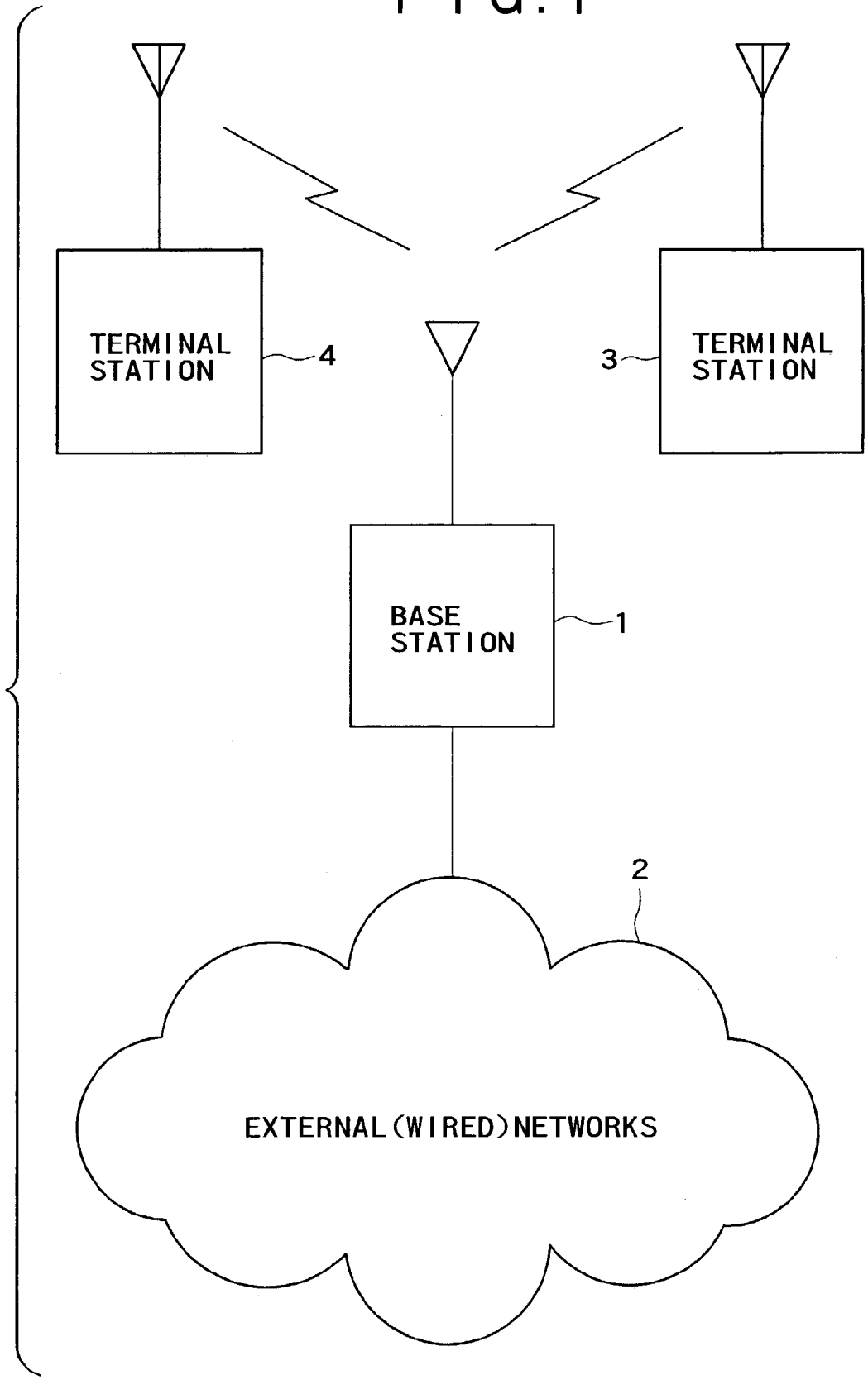
FIG. 1 is a diagram illustrating an example of the constitution of the system to which the present invention is applied.

The radio communication system according to the present invention is constructed as shown in FIG. 1. The illustrated system is constructed of a base station 1, an external network 2 wired to the base station, and a plurality of terminal (mobile) stations 3 and 4 for radio communication with the base station. Although only two terminal stations are shown in the figure, much more terminal stations may be available in practice. The system is constructed such that in principle radio communication takes place between the base station 1 and each of the terminal stations 3 and 4. The system performs radio communication by means of OFDM modulation which employs multi-carrier signals, as explained above in the section of the prior art. The radio communication system used herein is the one designated as HiSWANa (high-speed wireless access network).

Figure 2:
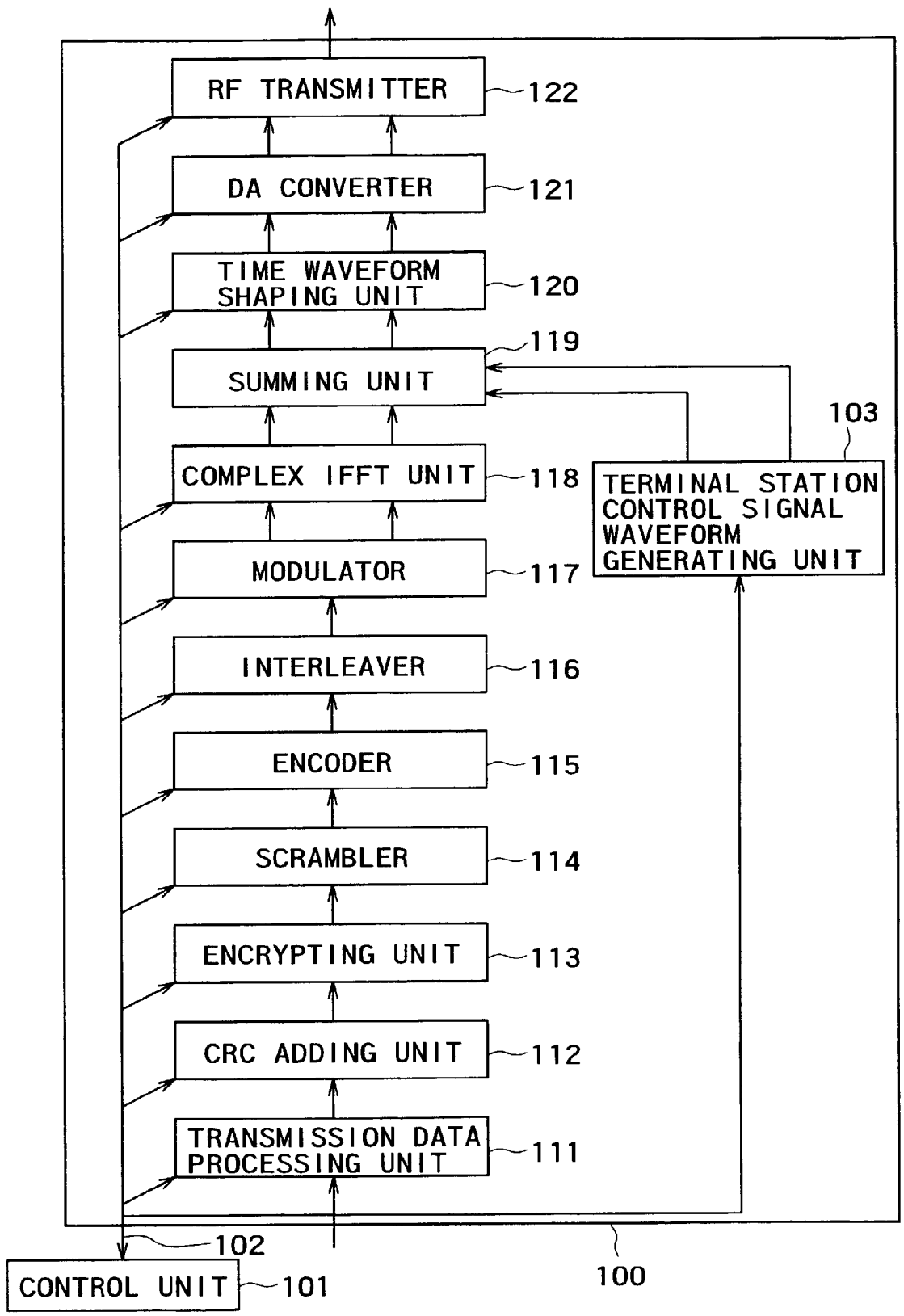
FIG. 2 is a block diagram showing an example of the constitution of the transmitting unit of the base station according to the first embodiment of the present invention.

The construction of the base station will be described below with reference to FIG. 2. FIG. 2 shows the constitution of the transmitting unit 100 in the base station. In the base station, voice signals and digital data (for data communication) are converted into adequate digital data strings by a data input-output processing unit (not shown). The output from it enters the transmission data processing unit 110. If necessary, it receives communication control data (to be transmitted to the terminal station which is the party of radio communication (not shown)) from the control unit 101, and it forms and outputs the frame and slot structure for transmission through the wireless section after adequate multiplexing.

The output from the transmission data processing unit 111 enters the CRC adding unit 112. After addition of redundancy for error detection at the receiving end, the output from the CRC adding unit 112 enters the encrypting unit 113 for encryption. The output from 113 enters the scrambler 114, in which pseudo random scrambling is performed according to a prescribed algorism. The output from 114 enters the encoder 115, in which error correction encoding is performed. There are several known methods for encoding, such as convolution coding, turbo coding, Reed-Solomon coding, and continuous coding (in which a plurality of coding methods are combined).

The output from 115 enters the interleaver 116, which performs interleaving (rearrangement of encoded bits according to a prescribed rule) so that the receiving end can convert burst errors into random errors by deinterleaving (reverse operation). The output from 116 enters the modulator 117, which, after mapping on the signal point at the time of transmission, outputs the in-phase component (I-component) and quadrature component (Q-component). The output from 117 enters the complex IFFT unit 118, which performs inverse fast Fourier transform for OFDM modulation.

The output from 118 enters the summing unit 119, in which usually nothing is performed and the input is output as such. The output from 119 enters the time waveform shaping unit 120, in which guard time is established by addition of cycleprefix and windowing is performed so as to smoothen the rise and fall of the OFDM modulation symbol. The output from 120 enters the DA converter 121, which performs conversion from digital waveform into analog waveform. The output from 121 enters the RF transmitter 122, which performs filtering, vector modulation for I-component and Q-component, frequency conversion into an adequate transmitting frequency channel, transmitting power control, and amplification.

The output from 122, which is signals to be transmitted from the transmitter 100 of the base station, enters an antenna multiplexer (not shown). The output from it enters the antenna (not shown) to be eventually transmitted in the form of electromagnetic wave. The transmitted signals are received by the terminal station as a party for radio communication.

The foregoing description for the transmitting system is applicable to the ordinary transmitting process. However, in the case where it is necessary to transmit specific control data from the base station to the terminal station, the transmitter 100 of the base station performs the following actions. That is, the transmitter recognizes the presence of specific control data addressed the terminal station. Then, it transmits the control data, through the transmitting control signal line 102, to the terminal station control signal waveform generating unit 103, which generates the signal waveform corresponding to the received data. The thus generated signal waveform enters the summing unit 119, in which this signal waveform is added to that from the complex IFFT unit 118, and the result is output. The processing after this is identical with that in the case of ordinary transmitting signals mentioned above.

Incidentally, if operation in the summing unit 119 takes place such that the position at which the signal wave of specific control data is added overlaps with the position of OFDM-modulated wave generated in the complex IFFT unit 118, then it invalidates the OFDM-modulated wave at the overlapping position. In other words, it instructs through the transmission control signal line 102 that that portion of data to be transmitted by its subcarrier should be filled with nulls in the bit string generated y the transmission data generating unit 111, and the transmission data generating unit 401 perform the instructed processing. In the course from the CRC adding unit 112 to the complex IFFT unit 118, ordinary processing is carried out on the assumption that there exist no data in that portion. The summing unit 119 adds to that portion (in which data is absent) the signal waveform generated by the terminal station control signal waveform generating unit 103.

Figure 3:
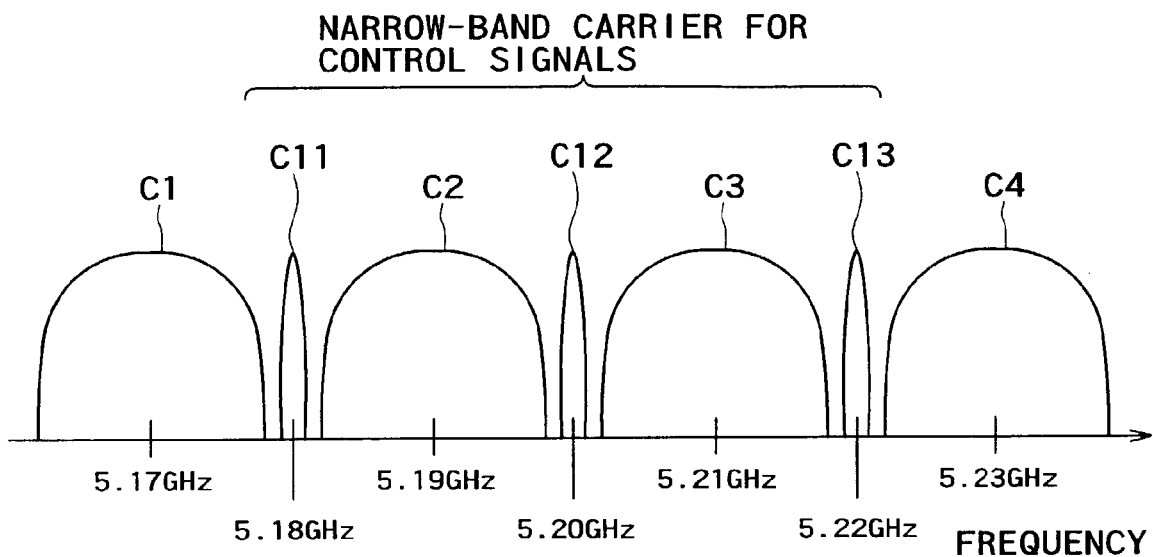
FIG. 3 is a diagram of frequency characteristics showing an example of the arrangement of carriers according to the first embodiment of the present invention.

The base station constructed as mentioned above also transmits control signals to the terminal station. Of the control signals, specific control signals (generated by the control signal waveform generating unit 103) are transmitted separately from the OFDM-modulated multi-carrier signals. In this embodiment, the specific control signals are arranged as briefly explained below. FIG. 3 shows an example of the carrier arrangement in the radio communication system according to this embodiment.

Figure 29:
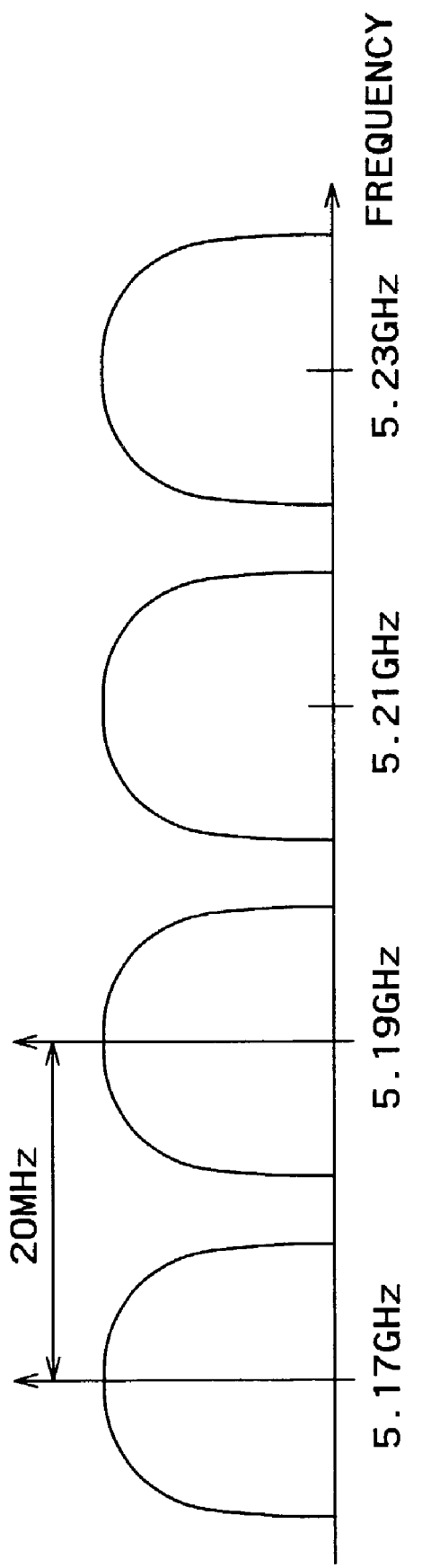
FIG. 29 is a diagram of frequency characteristics showing an example of the arrangement of carriers in the conventional radio communication system.
Figure 30:
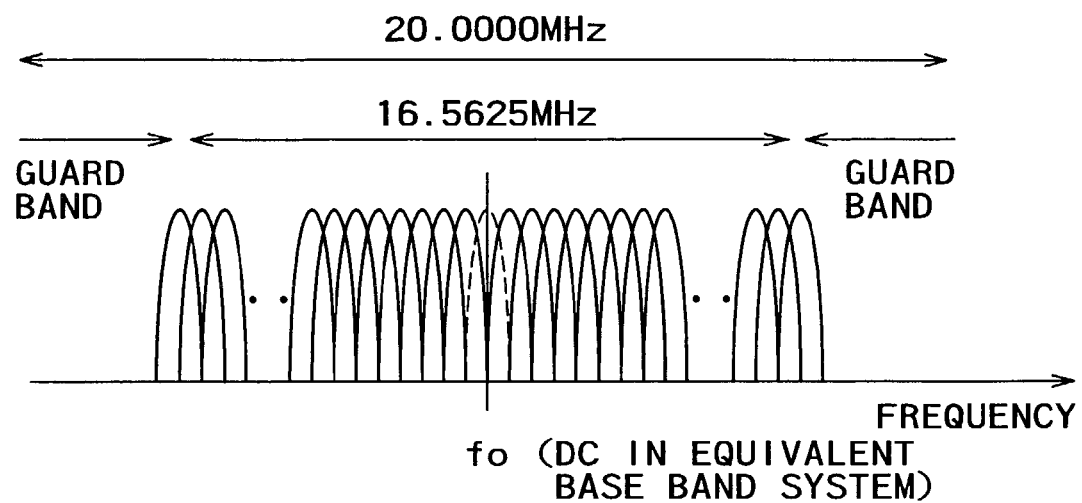
FIG. 30 is a diagram of frequency characteristics showing an example of the arrangement of subcarriers in the conventional radio communication system.

In this example, the carriers C1, C2, C3, C4, . . . for information communication are arranged at intervals of 20 MHz (5.17 GHz, 5.19 GHz, 5.21 GHz, . . . ). Each carrier for information communication transmits OFDM-modulated signals which are multi-carrier signals. The arrangement of frequencies mentioned above is identical with the conventional one shown in FIG. 29. However, the one according to this embodiment differs in that narrow band carriers C11, C12, C13, . . . for control signals are arranged at positions corresponding to the guard bands of the carriers for information communication which are arranged at intervals of 20 MHz. Each of the narrow band carriers for control signals is just 10 MHz away from the central frequency of the carrier for information communication. In other words, it is at the center of the guard band. The narrow band carriers for control signals are used to send part of control signals from the base station to the terminal station.

Arranging the narrow-band carriers as shown in FIG. 3 permits the terminal station to receive narrow-band carriers by using a frequency synthesizer (to determine the receiving channel of the terminal station) which varies the frequency intervals of carriers for information communication at 10 MHz steps unlike the conventional one which varies at 20 MHz steps. The typical construction of the terminal station will be described later. The signal bandwidth of the narrow-band carriers should preferably be a submultiple of the symbol rate or sample rate of the carrier for information communication. The band in which the narrow-band carriers are arranged is the frequency band corresponding to the guard band, and it does not interfere with communication in other bands so long as there is no power leakage into the adjoining bands.

Figure 4:
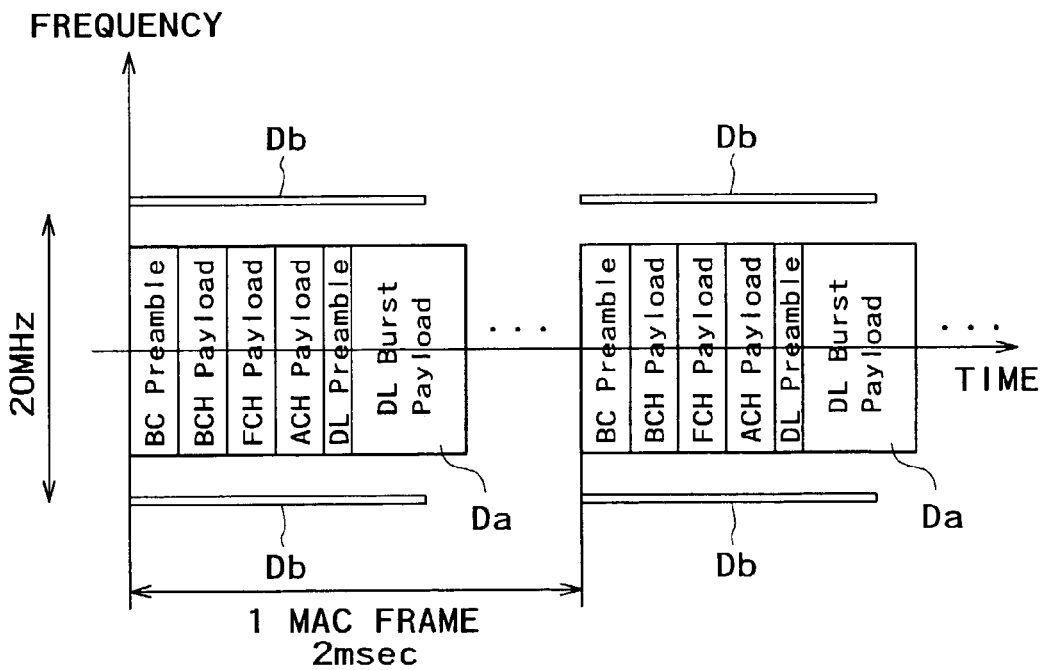
FIG. 4 is a timing diagram showing an example of the signal transmitting state according to the first embodiment of the present invention.
Figure 31:
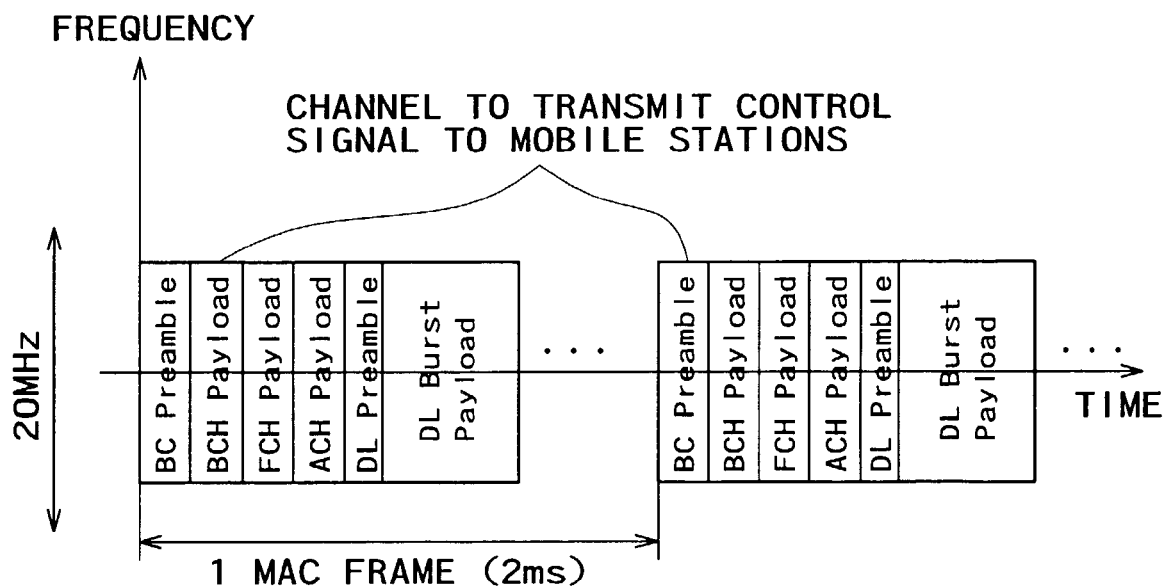
FIG. 31 is a diagram showing an example of the state for transmission of control signals in the conventional radio communication system.
Figure 32:
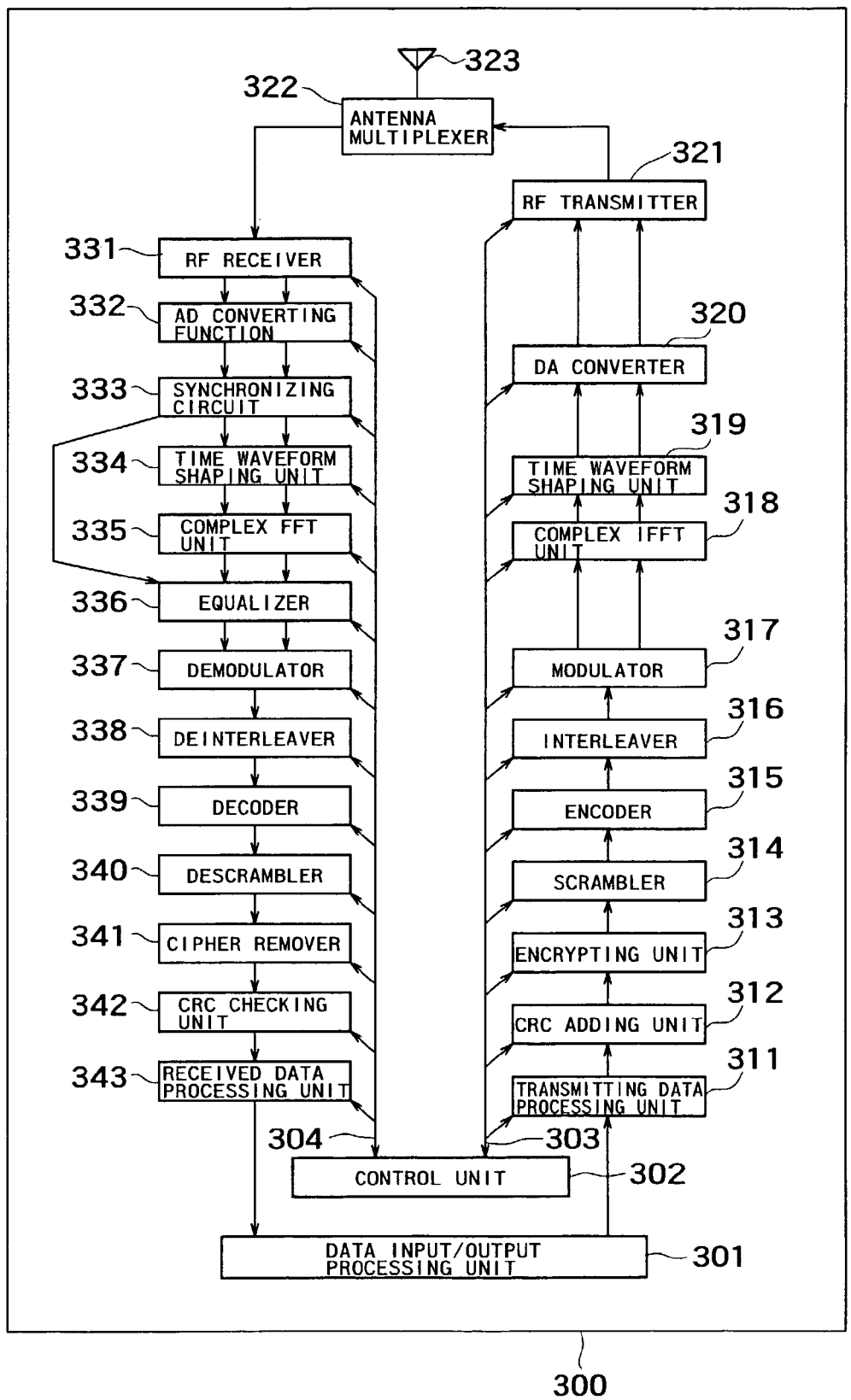
FIG. 32 is a block diagram showing an example of the constitution of the conventional terminal station.

The signals transmitted on the narrow-band carriers from the base station are in frame synchronism with the signals transmitted on the carriers for information communication. FIG. 4 shows the transmission format of the control signals in the radio communication system according to this embodiment. The base station transmits control signals Db by using the narrow-band carriers at the same time as the start of transmission of MAC frame for frame synchronization of signals Da transmitted on the carrier for information communication. The MAC frame is a transmitting-receiving unit to be established periodically at certain time intervals (2 ms in this case), as explained above with reference to FIG. 31 showing the conventional technology. The signals Da (shown in FIG. 4) which are transmitted on the carriers for information communication are constructed basically in the same way as in the conventional ones as shown in FIG. 31.

In the first half of each MAC frame, signals in the down channel (from the base station to the terminal station) are transmitted, and in the second half of each MAC frame, signals in the up channel (from the terminal station to the base station) are transmitted. The transmission of control signals Db from the base station to the terminal station by means of the narrow-band carriers is accomplished in the period in which signals are transmitted through the down channel in the MAC frame. Here, the transmission of the narrow-band carrier starts at the starting end of one unit of MAC frame, and the transmission of the narrow-band carrier completes before the down-link burst payload in that frame ends.

The advantage of transmitting narrow-band signals from the base station is that the terminal station can recognize the break of MAC frame of the carrier for information communication in the base station even though it receives only the narrow-band signals. As the result, it can recognize the break of MAC frame immediately and perform necessary processing when it starts reception in the carrier for information communication in response to information obtained by receiving the narrow-band signals or when it becomes apparent that transmission should be started in the carrier for information communication.

Part of the control signals to be transmitted from the base station to the terminal station by means of the narrow-band carrier is, for example, a call signal to call terminal stations individually or as a group. Upon reception of this call signal, the terminal station can judge that there is a call from the base station. A typical example of the processing that employs this call signal will be described later. Incidentally, in this embodiment, the base station transmits a call signal to the terminal station according to the procedure previously established by the system, in the section of control signal transmission of MAC frame, using the carrier for information communication, in the case where a call signal to call the terminal station is transmitted from the base station by using the narrow-band carrier. However, it is also possible to omit transmission of part of signals calling the terminal station using the carrier for information communication.

In the case of transmission using the narrow-band carrier as mentioned above, the base station may transmit individual signals by means of a plurality of narrow-band carriers arranged between guard bands as shown in FIG. 3. For example, the base station may previously determine a terminal station (a group of terminal stations) to which one narrow-band carrier is assigned.

Alternatively, the base station may transmit the same signal by using a plurality of narrow-band carriers. This is effective particularly in the case where the transmission line is affected by frequency-selective fading due to multi-path accompanying delay. The result is the frequency diversity effect which is characterized in that even though a signal transmitted by means of the narrow-band carrier arranged under the carrier for information communication falls in the trough of fading, a signal transmitted by means of the narrow-band carrier arranged above the carrier for information communication does not fall in the trough of fading. In this case, the terminal station can receive the narrow-band carrier arranged above or under the carrier for information communication, whichever is in a good receiving condition.

Figure 5:
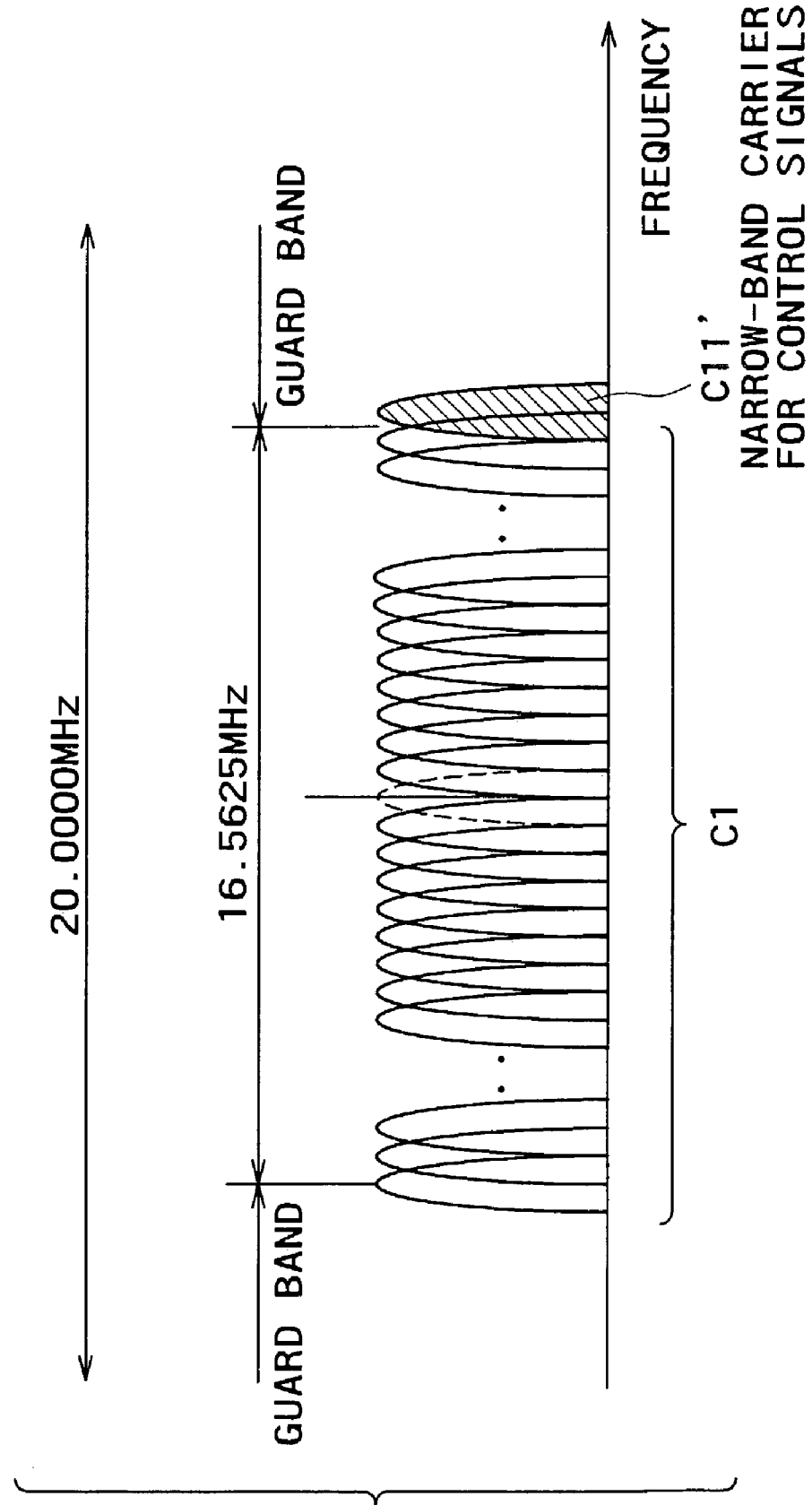
FIG. 5 is a diagram of frequency characteristics showing another example of the arrangement of subcarriers according to the first embodiment of the present invention.

Incidentally, the frequency arrangement shown in FIGS. 3 and 4 is made such that the narrow-band carrier is at the center of the guard band for OFDM-modulated signals. This is not necessarily so. For example, it is also possible that the narrow-band carrier C11' for control signals is arranged next to the subcarrier whose frequency is the top or bottom within the OFDM-modulated signal C1 in which a plurality or subcarriers are arranged at certain frequency intervals, as shown in FIG. 5. In this case, it is also possible that the frequency interval between the narrow-band carrier C11' for control signals and the subcarrier adjacent to it equals the frequency interval of the subcarriers of OFDM-modulated signals.

The result of arranging the narrow-band carrier for control signals as shown in FIG. 5 is that the processing to arrange the narrow-band carrier in the base station can be accomplished simultaneously with the processing of other signals in the block to generate OFDM-modulated signals. A possible way in this case is to cause the circuits from the transmission data processing unit 111 to the modulator 117 to transmit the control signals for the narrow-band carrier simultaneously and to cause the complex IFFT unit 118 to generate the OFDM-modulated signals having one more subcarrier. In the case where transmission processing is performed according to the carrier arrangement shown in FIG. 5, it is possible to eliminate the terminal station control signal waveform generating unit 103 and the summing unit 119, and hence it is possible to simplify the construction of the transmitting system in the base station.

Moreover, the narrow-band carrier for control signals may be arranged at any other position than the center of the guard band or the position adjacent to the subcarriers constituting the OFDM-modulated signals.

Figure 6:
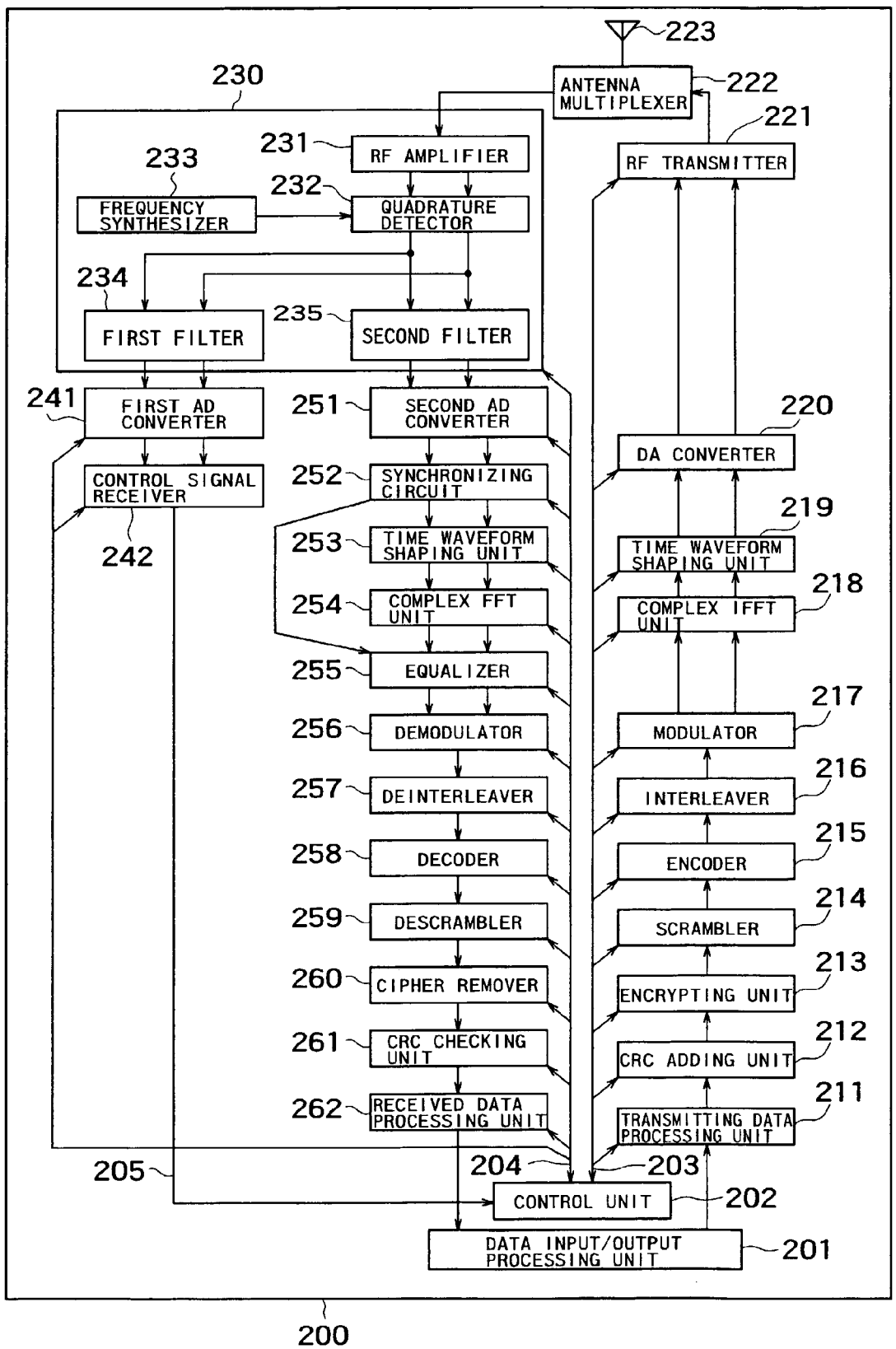
FIG. 6 is a block diagram showing an example of the constitution of the terminal station according to the first embodiment of the present invention.

The terminal station used in the radio communication system according to this embodiment is constructed as explained in the following. FIG. 6 shows an example of the construction of the terminal station 200 in the radio communication system according to this embodiment. The terminal station 200 uses a built-in battery as its power source, and hence it is a mobile stable that is portable.

The terminal station 200 has the transmission system which is constructed as explained below. The data input/output processing unit 201 receives the output of the voice coder in the case of voice communication or data signals in the case of data communication by connection to a computer. It converts such signals into an adequate digital data string. The resulting output enters the transmitting data processing unit 211. If necessary, it receives from the control unit 202 communication control data to be transmitted to another OFDM radio equipment (base station), which is the called party of radio communication (not shown), and after multiplexing, it forms and outputs the frame and slot structure for transmission through the radio channel.

The output from the transmitting data processing unit 211 enters the CRC adding unit 212, for addition of redundancy to detect errors in the receiving end. The output from 212 enters the cipher unit 213. After encryption, the output from 213 enters the scrambler 214 in which scrambling is performed for pseudo randomization according to a prescribed algorithm. The output from 214 enters the encoding unit 215 in which error correction encoding is performed. There are several known methods for encoding, such as convolution coding, turbo coding, Reed-Solomon coding, and continuous coding (in which a plurality of coding methods are combined).

The output from the encoding unit 215 enters the interleaver 216, which performs interleaving (rearrangement of encoded bits according to a prescribed rule) so that the receiving end can convert burst errors into random errors by deinterleaving (reverse operation). The output from 216 enters the modulator 217, which, after mapping on the signal point at the time of transmission, outputs the in-phase component (I-component) and quadrature component (Q-component). The output from 217 enters the complex IFFT unit 218, which performs inverse fast Fourier transform for OFDM modulation. The output from 218 enters the time waveform shaping unit 219, in which guard time is established by addition of cycleprefix and windowing is performed so as to smoothen the rise and fall of the OFDM modulation symbol.

The output from 219 enters the DA converter 220, which performs conversion from digital waveform into analog waveform. The output from 220 enters the RF transmitter 221, which performs filtering, vector modulation for I-component and Q-component, frequency conversion into an adequate transmitting frequency channel, transmitting power control, and amplification. The output signals from the RF transmitter 221 enter the antenna multiplexer 222. The output from 222 enters the antenna 223 to be eventually transmitted in the form of electromagnetic wave. The transmitted signals are received by the base station which is the called party of radio communication. The antenna multiplex 223 is designed to separate transmitting signals and receiving signals from each other. Usually, an antenna switch or duplexer is used for this purpose.

The terminal station 200 has the receiving system which is constructed as explained below. The receiving system performs the following processing when the terminal station 200 receives the ordinary traffic by means of the carrier for information communication. The signals which are received by the terminal station 200 are those which have been transmitted from the base station as the calling party of the radio communication.

The signal transmitted from the base station is received (in the form of electromagnetic wave) by the antenna 223. This signal is separated from the transmitting signal from the terminal station by the antenna multiplexer 222, and the separated signal enters the RF receiver 330. In the RF receiver, the RF amplifier 231 amplifies the received signal. The amplified output is mixed with the sinusoidal wave (generated by the frequency synthesizer 233) in the quadrature detector 232, and then it is separated into I-component and Q-component, with the center frequency being DC. The separated signal passes through the first and second filters 234 and 235, which filter only specific signal bands. The first filter 234 is intended to extract a specific control signal which is transmitted by means of the narrow-band carrier or specific subcarrier (mentioned later). It has a narrower pass band than the second filter 235. The second filter 235 is intended to extract the signals of ordinary traffic, and hence it extracts the signal of one unit of OFDM-modulated transmission channel.

The output from the first filter 234 enters the first AD converter 241, which performs conversion from analog waveform into digital waveform. The output from the first AD converter 241 enters the control signal receiver 242. The control signal receiver 242 detects the control signal from the base station, and it sends the detected information to the control unit 202 through the control signal line 205 (call-informing signal line mentioned later). The control signal to be detected by the control signal receiver 242 includes, for example, the signal indicating that the base station is calling the terminal station or the group to which the terminal station belongs.

The output from the second filter 235 enters the second AD converter 251 which performs conversion from analog waveform into digital waveform. (There may be an instance where the output from 251 undergoes oversampling and only the band of wanted signal is filtered by a digital filter.) The output from the second AD converter 251 enters the synchronizing circuit 252, which performs frame synchronizing and frequency error correction. In the case where any party available for communication is searched immediately after power is turned on, the synchronizing circuit 252 performs synchronizing signal detection and initial synchronizing.

The output from the synchronizing circuit 252 enters the time waveform shaping unit 253, which performs time waveform shaping to remove guard time by addition of cycleprefix. The output from 253 enters the complex FFT unit 254, which performs fast Fourier transform for OFDM demodulation. The demodulated output enters the equalizer 255. The equalizer 255 estimates the transmission line and performs equalization according to the result of estimate. In some cases, information from the synchronizing circuit 254 is also entered to the equalizer 255 to estimate the transmission line. The output from the equalizer 255 enters the demodulator 256, which performs signal point judgment and outputs the estimated value of received bit. The output from 256 enters the deinterleaver 257, which performs deinterleaving to rearrange the string of coded bits according to a prescribed rule. The output from 257 enters the decoder 258, which decodes the error correction code given by the transmitting end.

The output from the decoder 258 enters the descrambler 259, which performs descrambling as the inverse conversion of the scrambling performed in the transmitting end. The output from 259 enters the cipher remover 260, which removes cipher made by the transmitting end. The output from 260 enters the CRC checking unit 261, which outputs data from which CRC has been removed and the result of CRC checking of received blocks. The output from 261 enters the received data processing unit 262, which outputs data with the frame structure and slot structure (for transmission through the radio channel) removed, if it judges that there are no errors in the result of CRC checking of received blocks. The output from 262 enters the data input/output processing unit 201, which, after conversion, outputs sound signals in the case of voice communication or data signals in the case of data communication connected to a computer.

In the case where the received data contains communication control from the base station, the received data processing unit 262 takes it out, and the output from 262 enters the control unit 202 through the receiving system control line 204. The control unit 202 interprets the control data it has received and controls the action of each unit in the terminal station 200 according to the instruction.

In the case where the ARQ system employed, the received data processing unit 262 functions as follows. If the input signal from the CRC checking unit 261 contains information that the received block contains no errors, it outputs the received block to the received data processing unit 262 and also outputs to the control unit 202 through the receiving system control line 204, to the effect that the received block contains no errors. Upon receipt of this output, the control unit 202 instructs the transmitting data processing unit 211 through the transmitting system control line 203 to transmit ACK signal to the base station by multiplexing according to the actions mentioned above.

Conversely, if the input signal from the CRC checking unit 261 contains information that the received block contains errors, it does not output the received block to the received data processing unit 262 but outputs to the control unit 202 through the receiving system control line 204, to the effect that the received block contains errors. Upon receipt of this output, the control unit 202 instructs the transmitting data processing unit 211 through the transmitting system control line 203 to transmit NAK signal to the base station. The transmitting data processing unit 211 sends NAK signal after performing multiplexing on the transmitting data. The NAK signal is transmitted to the base station by processing of the transmitting system as explained above. Upon receipt of this transmission, the base station retransmits the block by which NAK signal has been transmitted.

In the case of stream communication, like voice communication, in which retransmission by the ARQ system is not employed, the received data processing unit 262 functions as follows. If the input signal from the CRC checking unit 261 contains information that the received block contains no errors, it outputs the received block to the received data processing unit 262 as mentioned above. Conversely, if the input signal from the CRC checking unit 261 contains information that the received block contains errors, the received data processing unit 262 discards the received block (handling it as erasure) and performs interpolation by using the received block before one block.

Each part of the transmitting system is connected to the control unit 202 through the transmitting system control line 203, and the control unit 202 controls and monitors various operations for the transmitting system through it (such as on-off of the transmitting system, control and monitor of the RF transmitter 221, fine adjustment of transmitting timing, change of the coding system and signal point mapping, and control of retransmitting). Each part of the receiving system is connected to the control unit 202 through the receiving system control line 204, and the control unit 202 controls and monitors various operations for the receiving system through it (such as on-off of the receiving system, control and monitor of the RF receiver 230, fine adjustment of receiving timing, change of the coding system and signal point mapping, and control of retransmitting).

Figure 7:
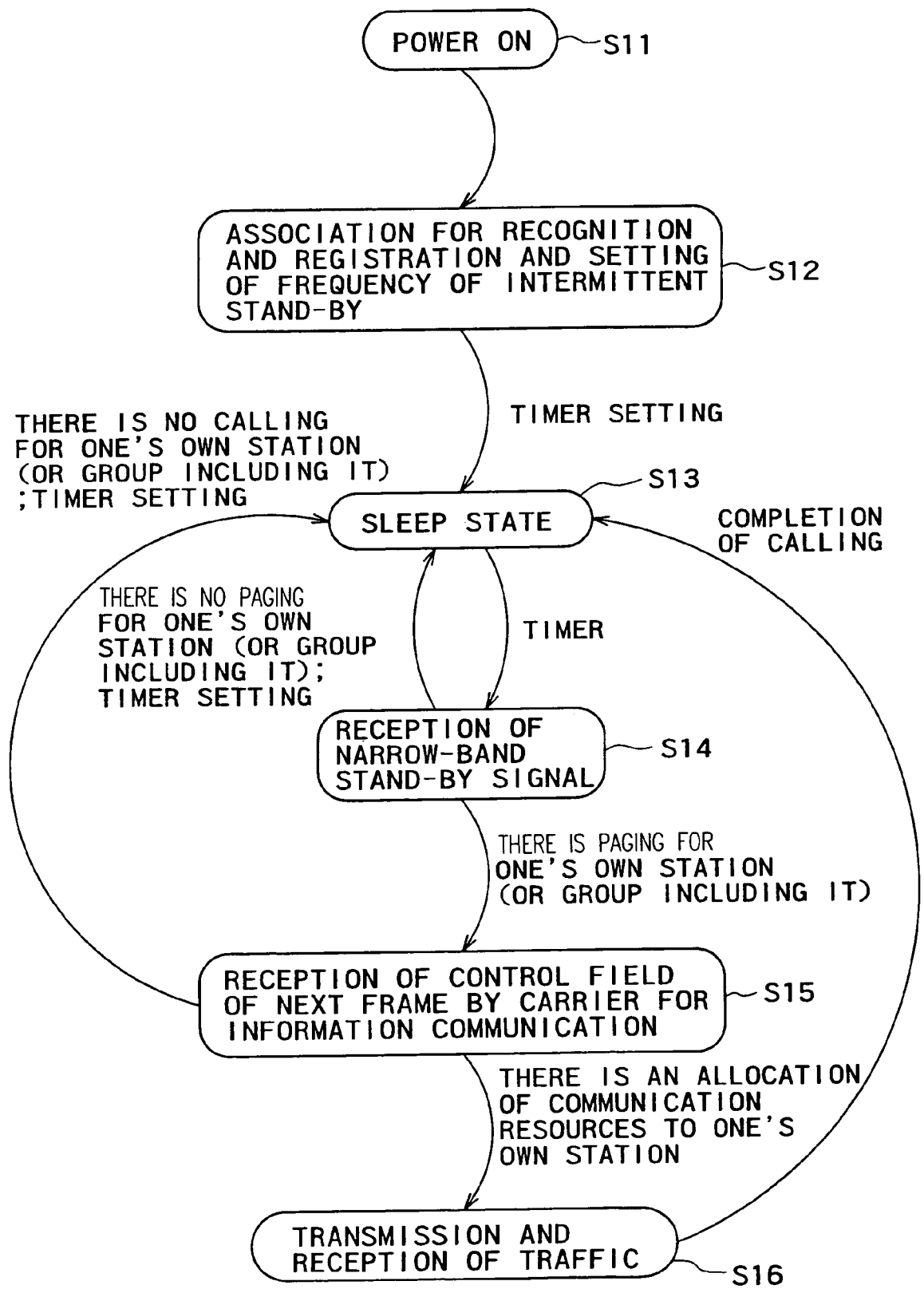
FIG. 7 is a diagram illustrating an example (part 1) of the transition of state in the terminal station according to the first embodiment of the present invention.

According to this embodiment, the terminal station 200 of the communication system works during stand-by as shown in FIG. 7. "Stand-by" means a state in which the terminal station is not communicating with the base station but is ready to reply if it is called by the base station. In the following description, the control signal transmitted by the narrow-band carrier is assumed to be the signal data (or part thereof) to call the terminal station.

After power has been turned on (Step S11), the terminal station 200 carries out association with the base station (before starting the stand-by action) so as to receive the calling code or the data corresponding to it (Step S12). It is assumed that it is agreed upon by negotiation between the base station and the terminal station that the frame intervals to be received is thinned out and that the time interval and standard time for it has been established in the control unit 202 in the terminal station.

When the terminal station receives the control signal transmitted by means of the narrow-band carrier, with necessary settings made as mentioned above, only the fundamental frequency oscillator and the counter in the control unit 202 are in action in the terminal station, and the timer to measure the timing for reception is set. All other parts are in a sleep state (with power turned off) under control from the control unit 202 through the receiving system control line 204 (Step S13).

As the time for reception approaches while the system is in this sleep state, the control unit 202 turns on power for the parts necessary for reception of stand-by signals through the control signal line 204 of the receiving system. The timing for power on is slightly earlier than the time at which signals to be received would arrive, in consideration of the frequency errors of the fundamental frequency oscillator and the rise time required for the receiver of the terminal station after it has been turned on.

When the timing to receive the control signal transmitted by means of the narrow-band carrier is reached, only the first filter 234, the first AD converter 241, and the control signal receiver 242 come into operation, so as to receive the band of the control signal transmitted by means of the narrow-band carrier, of the signals transmitted from the base station (Step S14). At this time, only the RF receiver 230 (excluding the second filter), the first AD converter 241, and the control signal receiver 241 are turned on, and other receiving parts in the terminal station are not turned on.

To be concrete, the band of receiving signal is limited by the first filter 234 so that only the first bandwidth corresponding to the bandwidth of the narrow-band carrier passes. And the output from it enters the first AD converter 241. The analog receiving signal, with its band limited in this manner, undergoes sampling at a frequency higher than (preferably higher than twice) the first bandwidth, in the first AD converter. After conversion, the AD converter outputs digital signals. The digital signals enter the control signal receiver 242 to detect calling signal from the base station. Thus the control signal receiver 242 judges whether or not one's own station (or the group to which it belongs) is being called.

If the control signal receiver 242 judges that one's own station (or the group to which it belongs) is being called, it informs the control unit 202 through the call informing line 205 that it is being called. Then, it starts the processing required when the terminal station is called (Step S15). For example, the control unit 202 activates the receiving system through the receiving system control line 204, so as to receive the control signal containing the regular calling signal which is transmitted by the head of the OFDM-modulated signal of the MAC frame and which is originally prepared by the system. In this case, if the carrier arrangement is as shown in FIG. 3, reception of the narrow-band carrier shifts to reception of the OFDM-modulated signal and hence the receiving frequency changes by at least 10 MHz. It judges the frequency and time slot allocated to the terminal station, which are indicated by the control signal arranged in the received MAC frame, and performs information transmission by using the indicated frequency and slot.

In the case where it is judged, upon reception of the narrow-band carrier in Step S14, that one's own station (or the group to which it belongs) is not being called, it returns to the sleep state in Step S13 and waits until next reception of the narrow-band carrier. In the case where it receives the narrow-band carrier in Step S14 and judges that one's own station (or the group to which it belongs) has been called, and it receives the control signal containing the regular call signal in Step S15 but allocation of the time slot for one's own station is not made, it judges that the other terminal in the called group including one's own station has been called or the judgment of reception of the calling signal was erroneous, and the control unit 202 resets the counter inside and turns off power, except for the fundamental frequency oscillator (not shown) and the counter in the control unit 202, through the receiving system control line 204. Thus the terminal station 200 returns to the stand-by sleep state in Step S13.

In the example shown in FIG. 7 (which illustrates transition of the state from the stand-by state), the terminal station becomes ready for traffic transmission and reception as soon as it receives the control signal transmitted from the base station. The same procedure may be applied to any system which needs transmission of access signal from the terminal station to the base station before the terminal station starts traffic transmission and reception. Transition of the state in this case is illustrated by example in FIG. 8.

Figure 8:
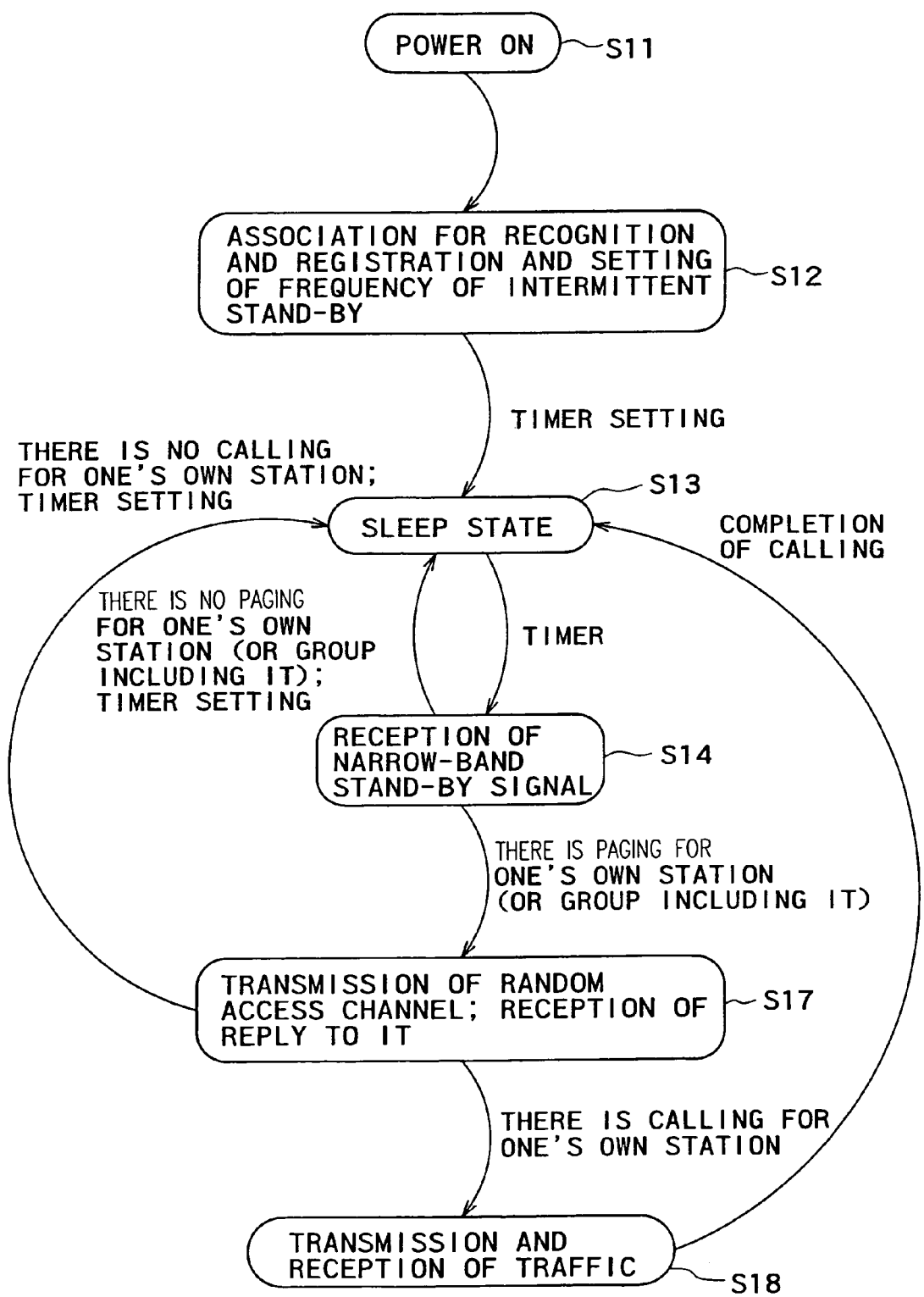
FIG. 8 is a diagram illustrating an example (part 2) of the transition of state in the terminal station according to the first embodiment of the present invention.

In the example shown in FIG. 8, in the case where calling of the terminal station (or a group to which it belongs) is judged upon reception of the narrow-band carrier in Step S14, the state moves to Step S17, in which the control unit 202 turns on the transmission system through the transmitting system control line 203, and performs transmission by means of the up random access channel in the MAC frame, and the control unit 504 activates the receiving system through the receiving system control line 204 with adequate timing, turns on all the receiving system (except for the first filter 234, the first AD converter 241, and the control signal receiving unit 242), receives down reply from the base station in the MAC frame, and it makes judgment according to the reply whether the call was really the one addressed to the terminal station, whether the group including the terminal station was called and the terminal station was also called, whether the group including the terminal station was called but the terminal station was not called actually, or whether there was no calling signal addressed to the terminal station or the group to which it belongs, and when it was found that the terminal station was called, the ordinary procedure to start call connection is started and the state moves to the transmission and reception of traffic in Step S18.

In the case where it was found that the terminal station was not called as the result of confirmation which was made by using the random access channel and its reply, it judges that the other terminal station in the group to which the terminal station belongs was called or it judges that the judgment of reception of calling signal was erroneous, the control unit 202 resets the counter inside and turns off all the units (except for the fundamental frequency oscillator (not shown) and the counter in the control unit 202) through the receiving system control line 204, and the terminal station 200 returns to the waiting sleep state in Step S13. In the case where the control signal receiving unit 242 judges that one's own station (or the group to which it belongs) is not called, it informs the control unit 202 through the call-informing signal line 205 that there is no call. Upon reception of this information, the control unit 202 resets the counter inside and turns off all the units (except for the fundamental frequency oscillator (not shown) and the counter in the control unit 202) through the receiving system control line 204, and the terminal station 200 returns to the waiting sleep state in Step S13. Other procedures in transition of the state shown in FIG. 8 are the same as those in transition of the state shown in FIG. 9.

The signal system of the control signal transmitted and received by means of the narrow-band carrier is illustrated by example in the following. In the case of this example, the control signal transmitted and received by means of the narrow-band carrier is different in modulation scheme from that transmitted as the OFDM-modulated signal in the MAC frame, so that the receiving end can easily detect the received signal. Here, it is assumed that part of the control signal is transmitted by means of the narrow-band carrier. For example, the procedure is applicable to the case in which information of several bits per MAC frame is transmitted.

Figure 9:
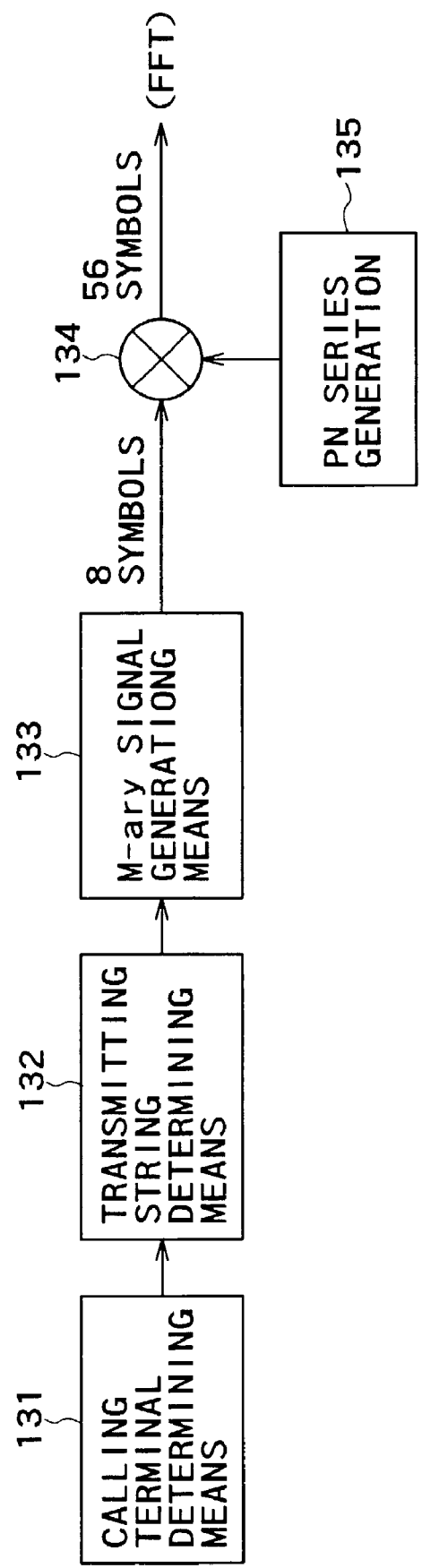
FIG. 9 is a block diagram showing an example of the constitution of the base station according to the first embodiment of the present invention.

First, FIG. 9 shows part of the procedure by which the control signal is transmitted from the base station. There may be an instance in which the base station divides the terminal stations it accommodates now into several groups and performs calling to each group on the time division basis. In this case, the terminal station previously knows by negotiation the timing with which a calling signal is transmitted to it, and it performs reception intermittently only with this timing.

The base station picks up a specific terminal station which it actually wants to call, from a group of terminal stations to be called with the timing of each MAC frame. This pick-up work is accomplished by the calling terminal determining means 131 shown in FIG. 9. The result is sent to the transmission bit string determining means 132, so as to generate a bit string which has previously been made to correspond to one or more terminal stations to be called. This bit strain is sent to the M-ary signal generating means 133, and it is converted into the M-ray code corresponding to the bit string entered.

FIGS. 11A to 11H show the examples of M-ary codes. The example illustrates the conversion of 3-bit data into 8-symbol M-ary code. This coding system allocates mutually orthogonal vectors to respective data. It is characterized by the capability of detecting the transmitted data by simple correlation detection at the receiving side.

The signal generated in this manner by the M-ary signal generating means 133 is multiplied (polarity inversion) in the multiplier 134 by the pseudo-random series generated by the PN (Pseudo Noise) series generating means 135. In this way the spectrum is lightly spread. Seven-fold spreading is performed in the example shown FIG. 9. Thus, a total of 56 symbols is output eventually. In the base station, the symbol which has been output in this way is arranged at a position which is 10 MHz away from the OFDM-modulated signal in the case where frequencies are arranged such that the narrow-band carrier is placed at the center of the guard band as shown in FIG. 3. The thus arranged frequencies are transmitted. Also, in the case where the narrow-band carrier is placed next to the OFDM-modulated signal as shown in FIG. 5, the symbol which has been generated by the system as shown in FIG. 9 is sent to the complex IFFT unit for transmission processing in the base station, so that it is multiplexed with the signal on the carrier for information communication and then transmitted.

Figure 10:
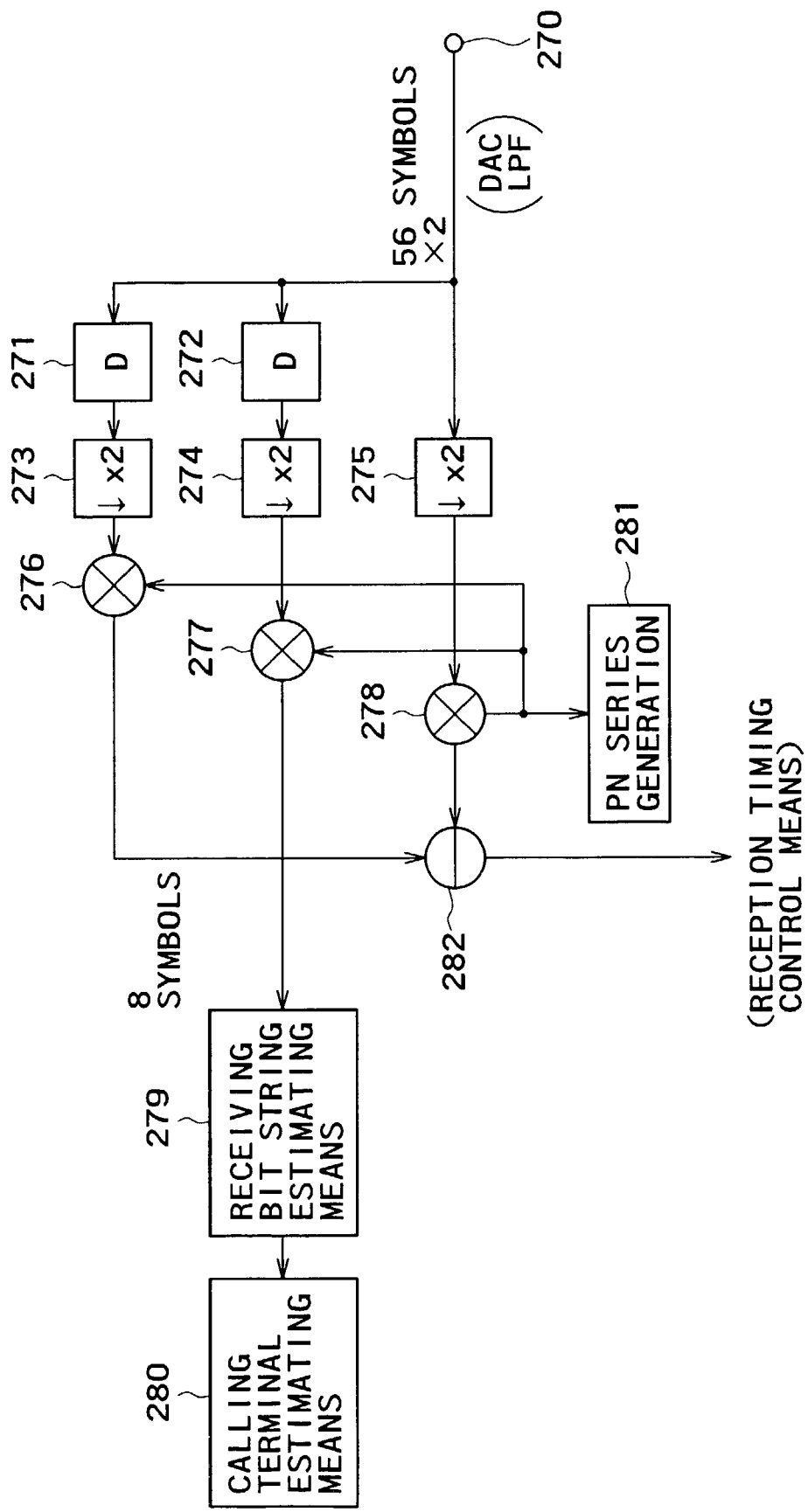
FIG. 10 is a block diagram showing an example of the constitution of the terminal station according to the first embodiment of the present invention.

Now, the signal which has been generated in the base station and generated by means of the narrow-band carrier as mentioned above is received by the terminal station by the system as explained below with reference to FIG. 10. FIG. 10 shows part of the system for reception in the terminal station 200. To be concrete, it shows the internal construction of the control signal receiving unit 242 shown in FIG. 6.

The first AD converter 241 which is placed in the stage before the control signal receiving unit 242 as shown in FIG. 6 is operated at twice the symbol rate of the narrow-band signal, and the output from the first AD converter 241 has its signal band limited by a digital filter (LPF) (not shown) and then it is transferred to the input end 270 shown in FIG. 10. This signal undergoes reverse spreading and decoding, with reception timing corrected by DLL (Delayed Lock Loop).

Typical signal processing will be explained below with reference to FIG. 10. The signal which has been entered is divided into three categories. Each category is delayed by one sample time by means of the delay circuits 271 and 272. The signal in each category has its symbol rate doubled by means of the conversion circuits 273, 274, and 275. The same PN series as used when spectrum is spread at the transmitting side is generated by the PN series generating means 281. The signal of each category is multiplied by the PN series by means of the multipliers 276, 2772, and 278, so that reverse spreading is performed. Of the signals in three categories obtained by reverse spreading, the one whose timing is at the center undergoes decoding, and the remaining two signals undergo subtraction by means of the subtractor 282 and then the results are sent to the reception timing control means (not shown). The reception timing control means performs timing control to prevent the reception timing from drifting in the same way as the reception timing control accomplished by means of an ordinary DLL.

On the other hand, the signal to undergo decoding is sent to the received bit estimating means 279, which performs MLSE (Maximum Likelihood Sequence Estimator) on the signal which has undergone M-ary coding by correlation detection and then outputs the estimated value of the received bit series. The estimated value of the received bit series is sent to the calling terminal estimating means 280, which judges whether or not the one's own terminal station is being called with said timing and performs the processing according to the result of the judgment.

The constitution as shown in FIG. 9, which generates the control signal and transmits it from the base station by means of the narrow-band carrier, offers the advantage that the receiving system in the terminal station does not need to estimate the transmission line and is capable of decoding the transmitted signal in a simple manner as shown in FIG. 10. This makes feasible the communication superior in immunity to noise. In addition, the reception timing control can be realized only by simple processing. This contributes to the further reduction in electric current consumption.

Figure 12:
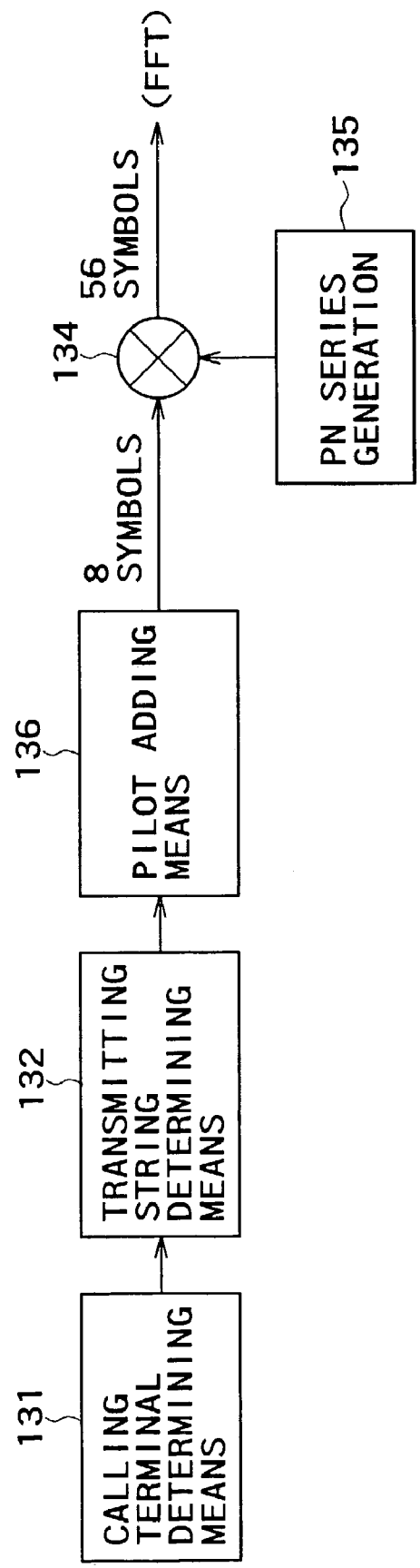
FIG. 12 is a block diagram showing another example of the constitution of the base station according to the first embodiment of the present invention.

The systems for control signal transmission as shown in FIGS. 9 and 10 are constructed so simple as to obviate the necessity of estimating the transmission line such as channel response. However, they may be modified such that transmission is preceded by, in place of the above-mentioned M-ary modulation, the spectrum spreading, with the pilot symbol (as a known symbol) added. FIG. 12 illustrates by example how coding is accomplished in the transmission side (base station) in the case where the pilot symbol is added. In this example, the procedure consists of sending the output from the calling terminal determining means 131 to the transmitting string determining means 132, generating the bit string which has previously been made to correspond to the terminal station to be called, and sending the thus generated bit string to the pilot adding means 136, thereby adding the pilot symbol as the known symbol.

For spectrum spreading, the signal having the pilot symbol added by the pilot adding means 136 is multiplied by means of the multiplier 134 by the pseudo random series generated by the PN series generating means 135. The spread output is transmitted by means of the narrow-band carrier or specific subcarrier as in the case shown in FIG. 9. In the case of transmission from the base station by means of the system shown in FIG. 12, the receiving system in the terminal station is capable of decoding in the same way as shown in FIG. 10 except that the processing in the receiving bit string estimating means is different.

Moreover, the system for transmission of control signal (such as calling signal) may employ a coding form which permits DC offset to be eliminated in a simple manner. That is, as shown in FIG. 13A, when transmitting signal data (or part thereof) to call a mobile station by using the subcarrier, one transmits the same data repeatedly even times in such a way that half the data transmitted has its polarity inverted. Assuming that the data (or part thereof) to call a mobile station is composed of six bits like "111010", the data is modulated by mapping into −1 and +1 as in the case of BPSK modulation. The advantage of repeating transmission even times while inverting the polarity is that it is possible to readily produce the cross relation waveform with DC offset removed, as shown in FIG. 13C, by using the signal which has been received repeatedly even times, even though the waveform obtained by the receiving unit in the terminal station has DC offset, as shown in FIG. 13B.

What happens if transmission is not carried out repeatedly even times such that half the data has the polarity inverted is that even though the same data is transmitted repeatedly from the base station as shown in FIG. 14A, the cross correlation waveform (shown in FIG. 14C) in the receiving side retains the DC offset if the DC offset (shown in FIG. 14B) occurs in the waveform received in the terminal station. However, this problem can be easily tackled by performing transmission as shown in FIG. 13.

The above-mentioned M-ary coding is limited in the number of bits required. (For example, in the case of n-bit information, the M-ary coding needs $2^n$ bits for transmission.) If it is impossible to transmit as many bits as necessary in actual operation, it is desirable to perform transmission as shown in FIG. 13. For example, it is assumed that the signal data (or part thereof) to call a mobile station which is limited by the usable DC subcarrier band has a symbol length of 3.2 μs. And it is also assumed that the time for transmission of this data is 44 μs.

Under this assumption, the signal data (or part thereof) to call the terminal station is 44÷3.2=13.75, which implies that it is possible to transmit only 13 symbols. Therefore, it is not suitable for M-ary coding. In this case, the signal data (or part thereof) to call the mobile station is made 6-bit long, and this signal data is transmitted more than once (twice in this case). Thus, the symbol length necessary for transmission is 38.4 μs, and no transmission is made in the remaining time.

Incidentally, the example shown in FIG. 13 is based on the assumption that the repeated transmission is performed in such a way that the bit string (with the polarity inverted) is transmitted after all the bits have been transmitted once. This procedure may be modified such that the inverted bit is inserted every other bit (which means, for example, conversion of "111010" into "101010011001").

Figure 15:
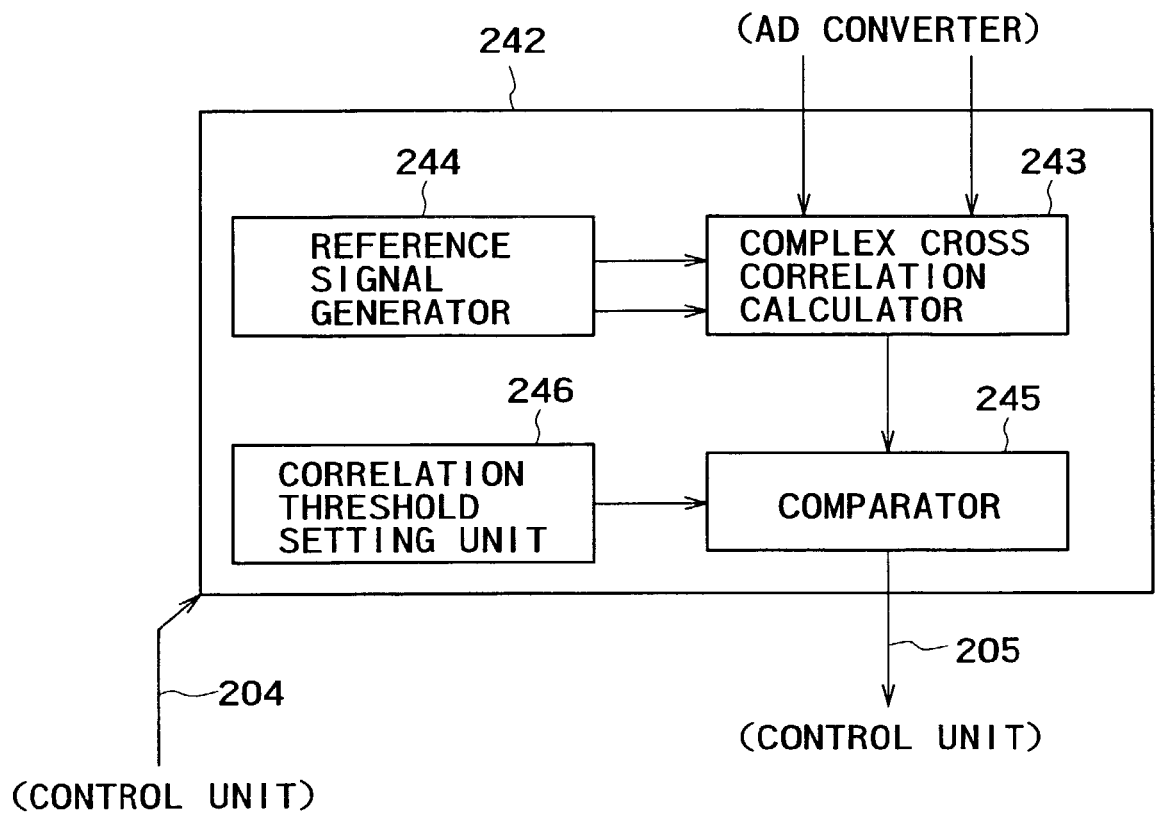
FIG. 15 is a block diagram showing an example of the important part of the terminal station according to the first embodiment of the present invention.

The receiving process which the terminal station performs when the control signal shown in FIG. 13 is transmitted from the base station will be illustrated below by example with reference to FIG. 15. FIG. 15 shows the constitution of the control signal receiving unit 242 in the terminal station shown in FIG. 6. It is so constructed as to receive the control signal by means of simple cross correlation detection. In this constitution, the control signal receiving unit 242 consists of a complex cross correlation calculator 243, a reference signal generator 244, a comparator 245, and a correlation threshold setting unit 246.

First, a bit string to transmit the code to discriminate one's own station (or a group to which it belongs) is set for the reference signal generator 244 by control from the control unit 202 through the receiving system control line 204. From this bit string the reference signal generator 244 generates the base band waveform to be transmitted by at least one subcarrier near the DC subcarrier in the equivalent base band system. The output (as the reference signal) from it is entered into the cross reference calculator 243.

On the other hand, the correlation threshold setting unit 246 establishes, according to control from the control unit 202 through the receiving system control line 204, a threshold value which permits the calculated cross correlation value to judge that one's own station (or a group to which it belongs) is being called. This threshold value is entered into the comparator 245. The received digital waveform, which has been output from the first AD converter 241, is entered into the cross reference calculator 243, in which cross correlation is calculated with respect to the reference signal which has been entered from the reference signal generator 244, and the resulting value is output. Then, the output enters comparator 245, in which it is compared with the threshold value set by the correlation threshold setting unit 246. If it is judged to have a higher correlation than the threshold value, then it informs the control unit 202 through the call-informing signal line 205 that there is a call. If it is judged to have a lower correlation than the threshold value, then it informs the control unit 202 through the call-informing signal line 205 that there is no call. The correlation threshold setting unit 246 may be dynamically controlled by the control unit 202 depending on the state of the radio transmission line and interference.

Owing to the procedure to seek the complex correlation, the control signal receiving unit 242 makes it possible to detect calling signals with a comparatively simple construction which consumes a less amount of electric power.

The second embodiment of the present invention will be illustrated below by example with reference to FIGS. 16 to 25.

As in the first embodiment, this embodiment is so constructed as to exchange wirelessly OFDM-modulated signals between the base station and the terminal station. It is identical with the first embodiment in the fundamental construction for information transmission. It differs from the first embodiment in that it uses a specific subcarrier in the OFDM-modulated signal to transmit specific control signals such as calling signals, instead of using the narrow-band carrier to transmit specific signals such as calling signals and performing transmission by means of the guard band.

Figure 16:
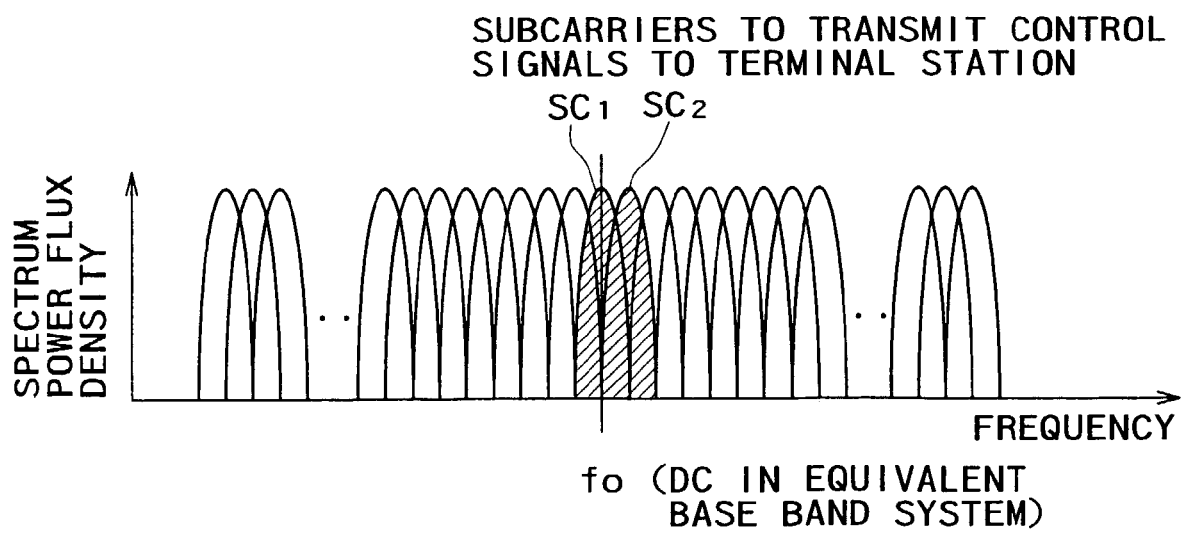
FIG. 16 is a diagram of frequency characteristics showing an example of the arrangement of subcarriers according to the second embodiment of the present invention.

FIG. 16 shows the arrangement of subcarriers for one transmission channel in this embodiment. A plurality of subcarriers are arranged at certain frequency intervals so that the OFDM-modulated signal is constituted. For example, a group of subcarriers are arranged at intervals of 312.5 kHz, with the total number of subcarriers being 53. In this embodiment, the 53 subcarriers are arranged as follows. At their center is the subcarrier $SC_1$ centered at DC in the equivalent base band system. (It corresponds to the subcarrier having the central frequency f0 in the carrier frequency band.) Adjacent (upward) to the subcarrier $SC_1$ at the center is the subcarrier $SC_2$. These two subcarriers are used to transmit specific signals (such as calling signals) in the specific section in each MAC frame.

Figure 17:
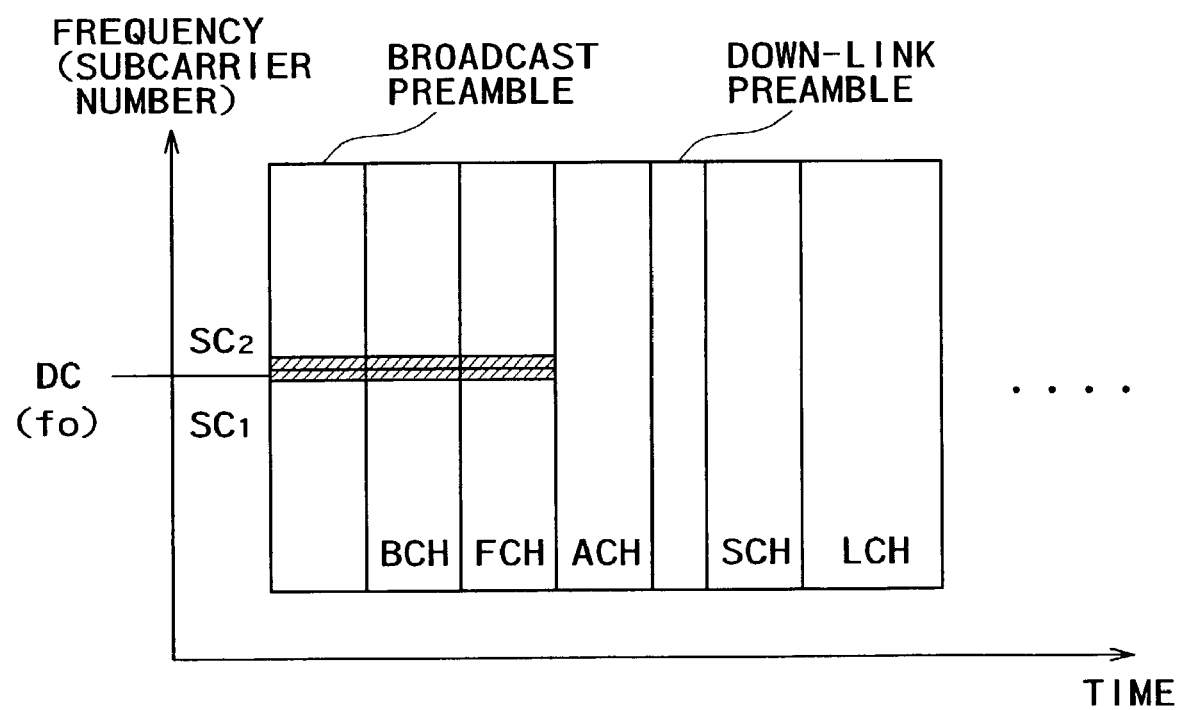
FIG. 17 is a timing diagram showing an example of the signal transmitting state according to the second embodiment of the present invention.

FIG. 17 shows the structure of one MAC frame used in this embodiment. Here, the transmission-reception unit is define, which is the MAC frame with a cycle of 2 ms. It is composed mainly of four sections: broadcast burst, down-link phase, up-link phase, and contention phase. Incidentally, FIG. 17 shows the broadcast burst and down-link phase only.

The broadcast burst consists of BCH for the multiple addressing of broadcast preamble and base station information, FCH to inform each terminal station of the traffic channel allocation in the same frame, and ACH for reply to RCH used for calling from the terminal station. In the case of this embodiment, the two subcarriers $SC_1$ and $SC_2$ shown in FIG. 16 are used for transmission of specific control signals in the sections of broadcast preamble, BCH, and FCH in the broadcast burst.

In each MAC frame, the section of ACH in the broadcast burst and the two subcarriers $SC_1$ and $SC_2$ in the section of the down-link phase and up-link phase are not used for transmission of specific control signals. In these sections which are not used for transmission of specific control signals, the two subcarriers $SC_1$ and $SC_2$ may be made null carriers which do not transmit any information or they may be used to transmit whatever information. A possible alternative is to make only the subcarrier $SC_1$ with a central frequency f0 null carries in the section after ACH and to use the adjoining subcarrier $SC_2$ to transmit information in the section after ACH.

Radio transmission from the base station with the above-mentioned subcarrier arrangement may be accomplished by the construction as explained in the first embodiment with reference to FIG. 2. All that is necessary is to place specific control signals (such as calling signals for the terminal station) in the data in the two subcarriers $SC_1$ and $SC_2$. In this case, the signals to be transmitted by using these two subcarriers $SC_1$ and $SC_2$ may undergo simple coding, such as M-ary coding, which permits easy processing for power saving, as in the case explained in the first embodiment with reference to FIGS. 9 to 12. Alternatively, it is possible to transmit repeatedly the same data in inverted form, thereby performing the transmission processing capable of removing DC offset, as explained with reference to FIGS. 13 to 15. It is also possible to perform transmission using the coding format which is identical with the signal to be transmitted by means of the other carriers.

Figure 18:
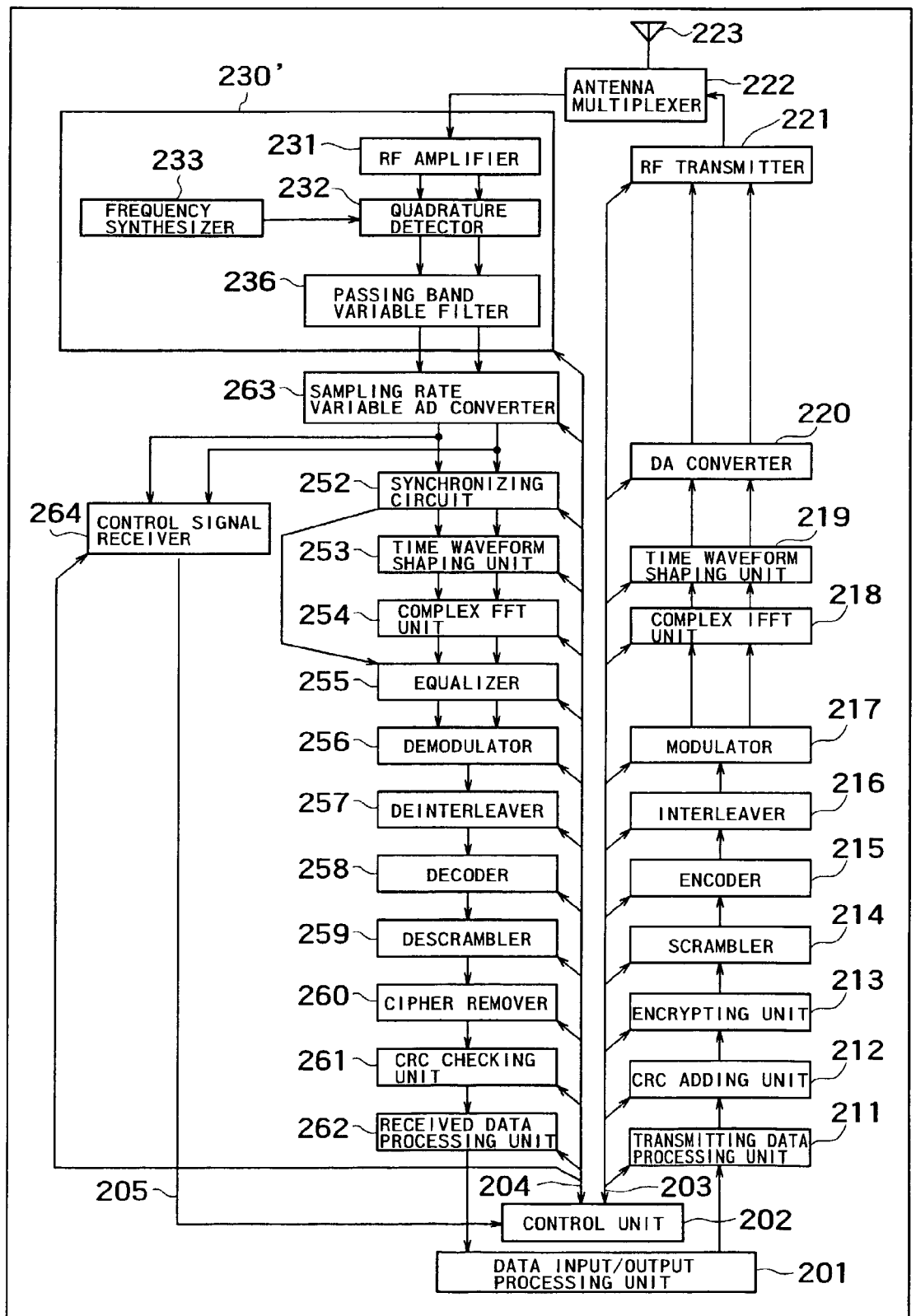
FIG. 18 is a block diagram showing an example of the constitution of the terminal station according to the second embodiment of the present invention.

The terminal station to receive signals transmitted from the base station is constructed as illustrated below by example with reference to FIG. 18. The terminal station 200' shown in FIG. 18 is constructed in the same way as the terminal station 200 shown in FIG. 6. Therefore, its description is omitted here. The receiving system of the terminal station 200' is constructed as follows. The radio signal from the base station is received by the antenna 223, and it enters the RF receiver 230' through the antenna multiplexer 222. In the RF receiver 230', the received signal is amplified by the RF amplifier 231. The amplified output is mixed with the sinusoidal wave (generated by the frequency synthesizer 233) in the quadrature detector 232, and then it is separated into I-component and Q-component, with the center frequency being DC. Only those signals in a specific band are filtered by the passing band variable filter 236.

This passing band variable filter 236 is so designed as to vary the passing band according to control by the control unit 202. At the time of ordinary reception, it is so set up as to pass the wide band including all the subcarriers (53 in this case) in one transmission band shown in FIG. 16. At the time of waiting reception, it is so set up as to pass the narrow band including only the two subcarriers $SC_1$ and $SC_2$ near the center.

The output from the passing band variable filter 236 enters the AD converter 263, which performs conversion from analogy waveform into digital waveform. The AD converter 263 used herein is the one capable of changing the sampling rate. Thus, it changes the sampling rate according to ordinary reception and waiting reception. This sample rate is established by control from the control unit 202.

The output from the AD converter 263 enters the control signal receiver 264 and the synchronizing circuit 252. The control signal receiving unit 264 detects control signals from the base station and sends the detected signal to the control unit 202 through the control signal line 205 (call-informing signal line mentioned later). The control signal to be detected by the control signal receiver 264 includes, for example, the signal indicating that the base station is calling the terminal station or the group to which the terminal station belongs.

The signal that has entered the synchronizing circuit 252 undergoes frame synchronization and frequency error correction, and the processed signal is output. The processing that is performed in the course from the synchronizing circuit 252 to the received data processing unit 262 is the same as that in the terminal station shown in FIG. 6. The output from the received data processing unit 262 enters the data input/output processing unit 201, which outputs the result of conversion into voice signals (in the case of voice communication) or data signals (in the case of data communication by connection to a computer).

The terminal station 200' of the communication system in this embodiment works at waiting time as explained below with reference to FIG. 19. Here, the term "waiting" denotes a state in which the terminal station is not performing information communication with the base station but is ready to reply to calling from the base station at any time. Incidentally, in the following description, it is assumed that the control signal transmitted by means of the narrow-band carrier is the signal data (or part thereof) to call the terminal station.

It is assumed that the terminal station 200', with its power turned on (in Step S11) but with the waiting operation not yet started, performs association with the base station so as to receive beforehand the code for calling or any data corresponding thereto (in Step S12). It is also assumed that an agreement that the intervals of frames to be received is thinned out is made by negotiation between the base station and the terminal station. It is assumed that the time interval and reference time have been established in the control unit 202 of the terminal station 200'.

When the terminal station receives control signals transmitted by means of the narrow-band carrier, with the foregoing settings established, it puts only the fundamental frequency oscillator and the counter in the control unit 202 into action at all times. Then it sets the timer to determine timing for reception. All other parts are in a sleep state, with power turned off, under control from the control unit 202 through the receiving system control line 204 (Step S13).

As the time for reception approaches while the system is in this sleep state, the control unit 202 turns on power for the parts necessary for reception of stand-by signals through the control signal line 204 of the receiving system. The timing for power on is slightly earlier than the time at which signals to be received would arrive, in consideration of the frequency errors of the fundamental frequency oscillator and the rise time required for the receiver of the terminal station after it has been turned on.

When the timing to receive the control signal transmitted by means of the narrow-band carrier is reached, the filter 236 is set in the narrow band, the sampling rate for waiting reception is established in the AD converter 263, and only the RF receiver 230' and the control signal receiver 264 come into operation, so as to receive only the two subcarriers $SC_1$ and $SC_2$ among the signals transmitted from the base station (in Step S14). The reception timing is such that only the broadcast preamble in MAC frame and the sections of BCH and FCH are received. At this time, only the RF receiver 230', the AD converter 263, and the control signal receiver 264 (which relate to reception) are turned on, and other receiving parts in the terminal station are not turned on.

The result of the receiving action in this manner is that the calling signal transmitted from the base station by means of the subcarriers $SC_1$ and $SC_2$ enters the control signal receiver 264, which judges whether or not one's own station (or the group to which it belongs) is being called.

If the control signal receiver 242 judges that one own station (or the group to which it belongs) is being called, it informs the control unit 202 through the call informing line 205 that it is being called. Then, it starts the processing required when one's own station is called (Step S19). Here, it sets the filter 236 in the wide band, sets the AD converter 263 to the sampling rate for ordinary reception, and turns on the receiving system from the synchronizing circuit 252 to the received data processing unit 262, so that it makes it possible to receive the control signal containing the regular calling signal which is transmitted by the head of the OFDM-modulated signal of the next MAC frame and is originally prepared by the system. It judges the frequency and time slot allocated to one's own station, which are indicated by the control signal arranged in the received MAC frame, and performs information transmission by using the indicated frequency and slot (in Step S20).

In the case where it is judged, upon reception of only subcarriers $SC_1$ and $SC_2$ in Step S14, that one's own station (or the group to which it belongs) is not being called, it returns to the sleep state in Step S13 and waits for the next timing for reception of the subcarriers $SC_1$ and $SC_2$. In the case where it receives only the subcarriers $SC_1$ and $SC_2$ in Step S14 and judges that one's own station (or the group to which it belongs) has been called and the time slot for one's own station is not allocated in the wide band reception in Step S19, it judges that the other terminal in the called group including one's own station has been called or the judgment of reception of the calling signal was erroneous, and the control unit 202 resets the counter inside and turns off power, except for the fundamental frequency oscillator (not shown) and the counter in the control unit 202, through the receiving system control line 204. Thus the terminal station 200 returns to the stand-by sleep state in Step S13.

The advantage of operating the system constituted as in the second embodiment is that all that is necessary is to receive intermittently specific subcarriers in the vicinity of the central frequency f0 in the carrier frequency band while the terminal station is in the stand-by state. This realizes the stand-by reception by a simple processing, thereby contributing to power saving in the terminal station in the stand-by state. In this case, the frequency received by the RF receiver 230 in the terminal station is exactly the same as that received in ordinary communication. Therefore, it is possible to set up the step of receiving frequency (such as 20 MHz) in the same as practiced in the conventional terminal equipment. This prevents the construction of the terminal station from becoming complex.

Figure 19:
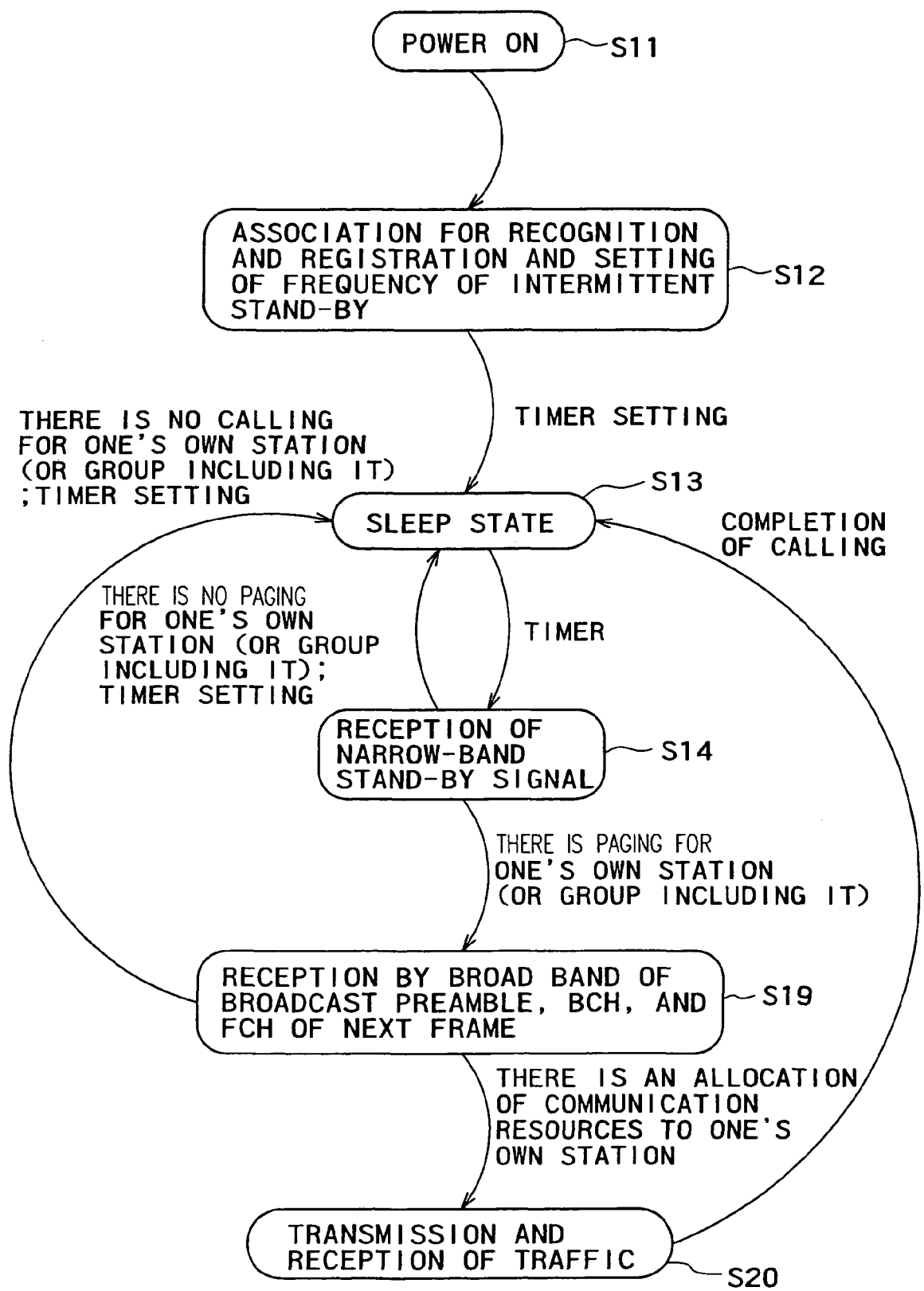
FIG. 19 is a diagram illustrating an example of the transition of state in the terminal station according to the second embodiment of the present invention.

Incidentally, transition from the stand-by state to the transmission-reception of traffic (as shown in FIG. 19) takes place upon reception of only the control signal transmitted from the base station. However, as in the case of transition in the first embodiment illustrated in FIG. 8, it is also possible to perform reception of stand-by signal in the narrow-band in this embodiment and reception of wide band for the system which needs transmission of signals for access to the base station from the terminal station before transition to the transmission-reception of traffic.

The arrangement of subcarriers, which is shown in FIG. 16 as an example of transmission in the second embodiment, is so designed as to transmit the calling signal (or part thereof) for the terminal station by means of two subcarriers (which are $SC_1$ with a central frequency F0 and $SC_2$ adjacent to $SC_1$) in the carrier frequency band. However, this arrangement may be modified such that one or more specific subcarriers near the central frequency in one transmission band is used for transmission of specific control signals such as calling signal.

Figure 20:
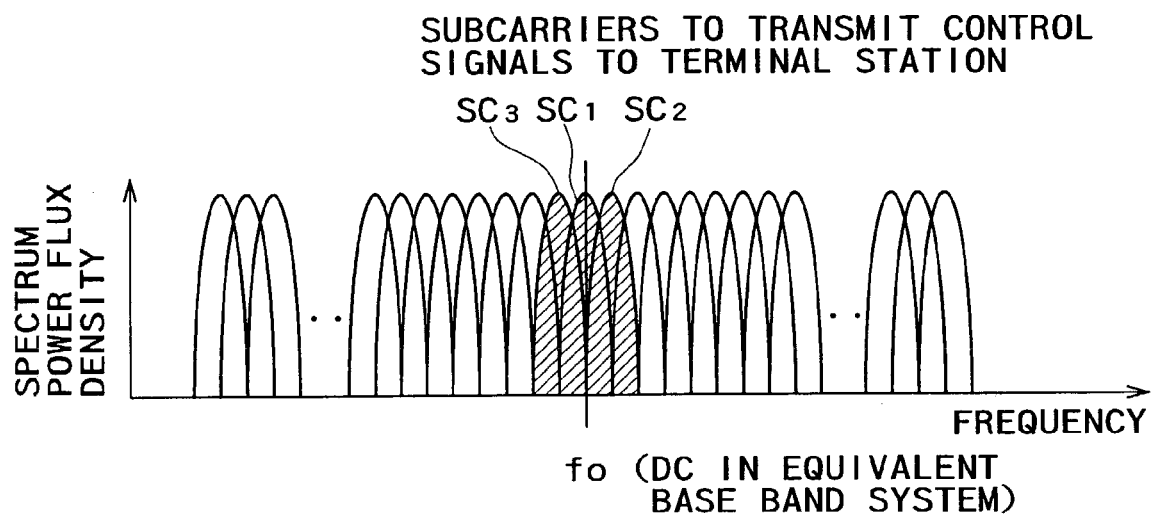
FIG. 20 is a diagram of frequency characteristics showing another example of the arrangement of subcarriers according to the second embodiment of the present invention.

The arrangement of subcarriers is illustrated by another example in FIG. 20. In the case where the OFDM-modulated signal is constructed such that one transmission band is composed of a plurality (e.g., 53) of subcarriers, the specific control signals, such as calling signal (or part thereof) for the terminal station, is transmitted by means of the subcarrier $SC_1$ with a central frequency f0 in the carrier frequency band, the subcarrier $SC_2$ adjacent (upper side) to the subcarrier $SC_1$, and the subcarrier $SC_3$ adjacent (lower side) to the subcarrier $SC_1$.

Figure 21:
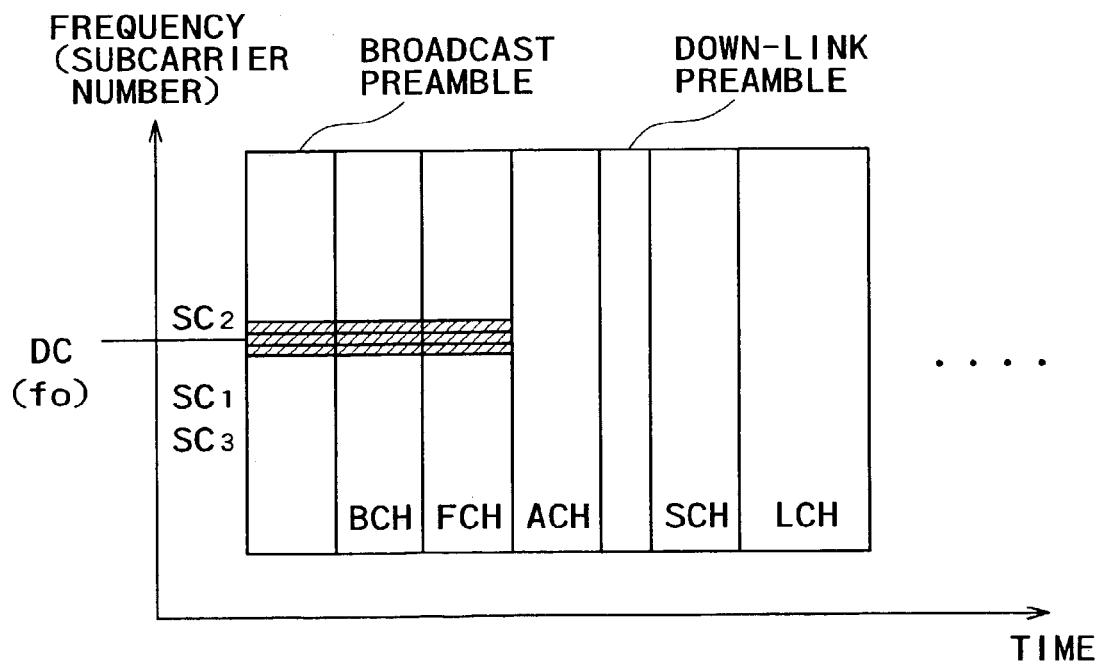
FIG. 21 is a timing diagram showing an example of the state of transmitting control signals in the example shown in FIG. 20.

In the case of the example shown in FIG. 20, the broadband burst and down-link phase in one MAC frame are as shown in FIG. 21. In the case of this example, the three subcarriers $SC_1$, $SC_2$, and $SC_3$, which are shown in FIG. 20, are used for transmission of specific control signals in the broadcast preamble in this broadband burst and in the section of BCH and FCH. In the sections not used for transmission of specific control signals of each MAC frame, the three subcarriers $SC_1$, $SC_2$, and $SC_3$ may be made null carriers which do not transmit any information and may be used for transmission of whatever information. A possible alternative is to make only the subcarrier $SC_1$ with a central frequency f0 null carries in the section after ACH and to use the adjoining subcarrier $SC_2$ and $SC_3$ to transmit information in the section after ACH.

In the section for transmission of specific control signals by these three subcarriers $SC_1$, $SC_2$, and $SC_3$, it is possible to adopt the coding format, such as correlation detection, which permits simple receiving processing with a less amount of power consumption, or to adopt the coding format which facilitates removal of DC offset, as mentioned earlier.

Figure 22:
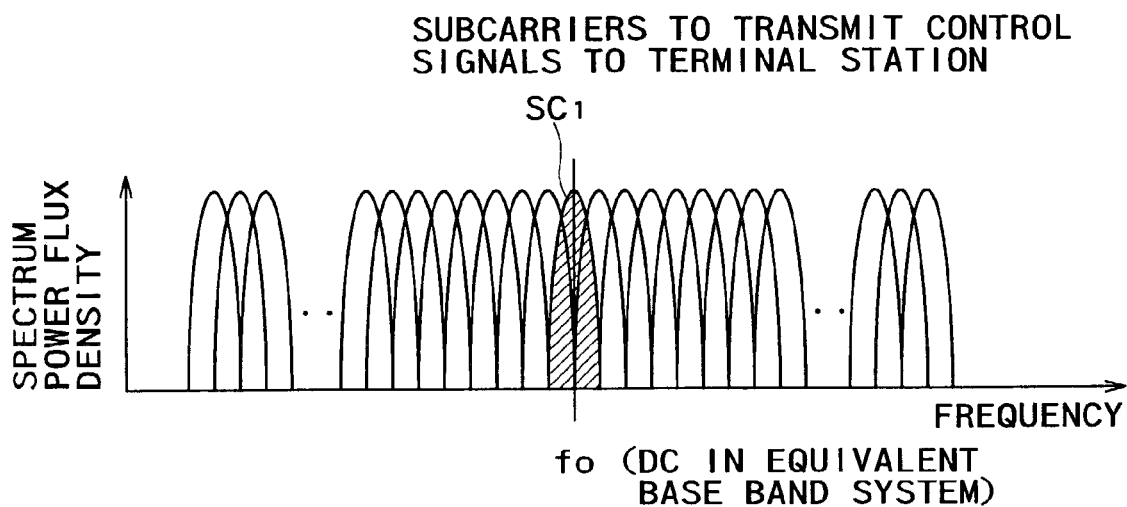
FIG. 22 is a diagram of frequency characteristics showing another example of the arrangement of subcarriers according to the second embodiment of the present invention.

Another example of the arrangement of subcarriers is shown in FIG. 22. In the case where the OFDM-modulated signal is constructed such that one transmission band is composed of a plurality (e.g., 53) of subcarriers, the specific control signals, such as calling signal (or part thereof) for the terminal station, is transmitted by means of only one subcarrier, which is the subcarrier $SC_1$ (or DC subcarrier in the equivalent fundamental band) with a central frequency f0 in the carrier frequency band.

Figure 23:
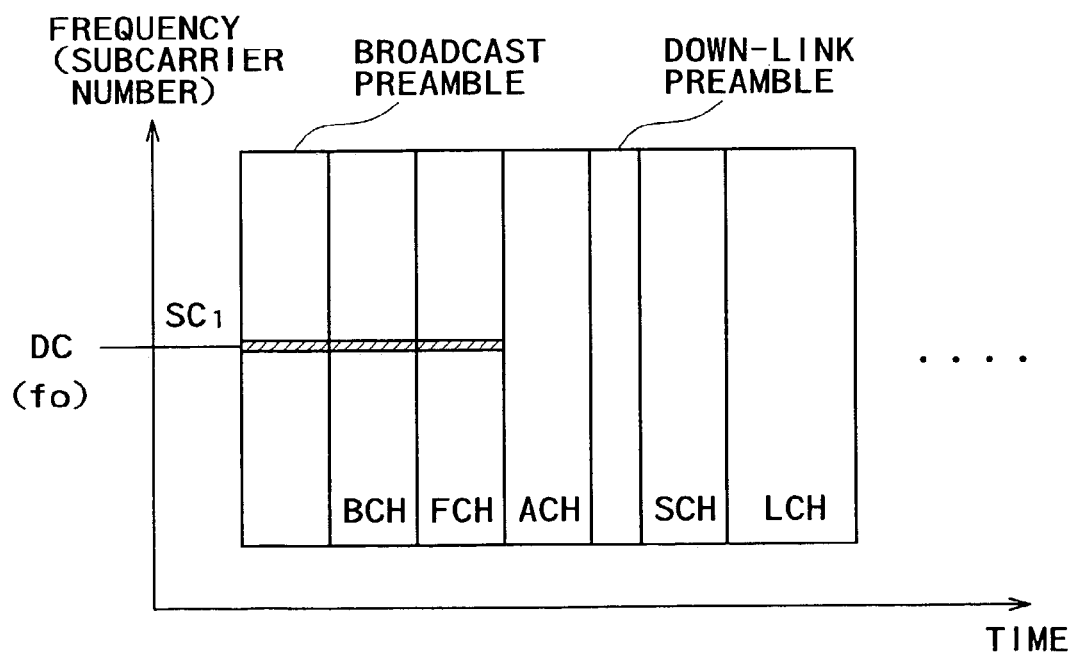
FIG. 23 is a timing diagram showing an example of the state of transmitting control signals in the example shown in FIG. 22.

In the case of the example shown in FIG. 22, the broadband burst and down-link phase in one MAC frame are as shown in FIG. 23. In the case of this example, the one subcarrier $SC_1$, which is shown in FIG. 22, is used for transmission of specific control signals in the broadcast preamble in this broadband burst and in the section of BCH and FCH. In the sections not used for transmission of specific control signals of each MAC frame, the subcarrier $SC_1$ may be made a null carrier which do not transmit any information and may be used for transmission of whatever information.

In the section for transmission of specific control signals by the subcarrier $SC_1$, it is possible to adopt the coding format, such as correlation detection, which permits simple receiving processing with a less amount of power consumption, or to adopt the coding format which facilitates removal of DC offset, so as to transmit control signals, as mentioned earlier.

Figure 24:
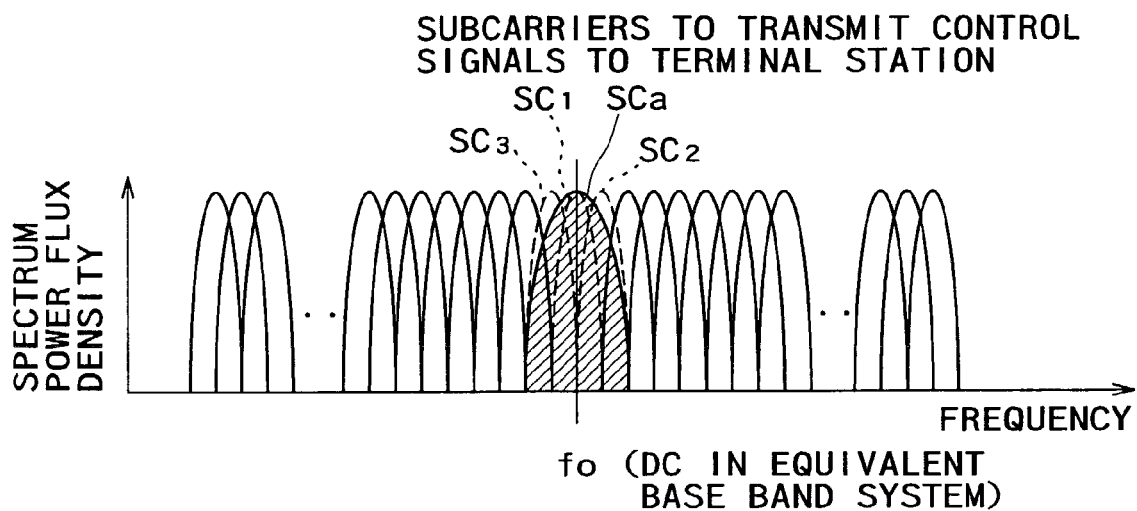
FIG. 24 is a diagram of frequency characteristics showing another example of the arrangement of subcarriers according to the second embodiment of the present invention.

Also, in the case where the position of a plurality of subcarriers with the central frequency f0 in the carrier frequency band is allocated to transmission of specific control signals, such as calling signals, it is permissible to arrange one subcarrier that occupies the band in which a plurality of subcarriers are arranged. That is, as shown in FIG. 24, for example, one subcarrier SCa is arranged by using the band in which three subcarriers $SC_1$, $SC_2$, and $SC_3$ are originally arranged, with the central frequency f0 centered in the carrier frequency band, and it is used for transmission from the base station. This wide band subcarrier SCa is used to transmit specific control signals, such as signals to call the terminal station.

Figure 25:
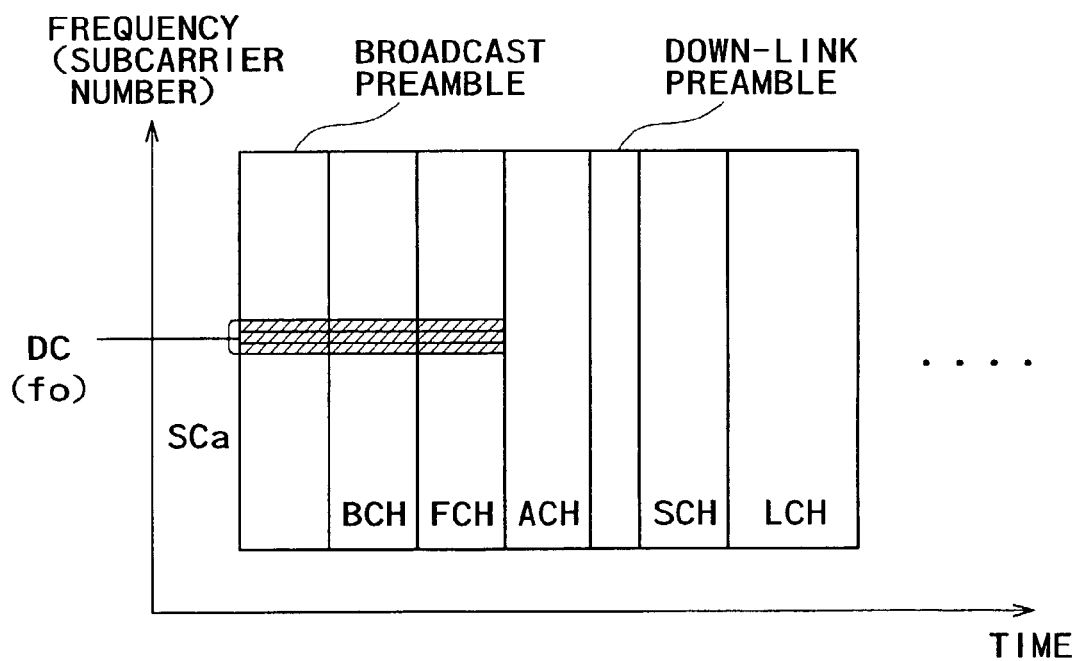
FIG. 25 is a timing diagram showing an example of the state of transmitting control signals in the example shown in FIG. 24.

In the case of the example shown in FIG. 24, the broadband burst and down-link phase in one MAC frame are as shown in FIG. 25. In the case of this example, the one subcarrier SCa, which is shown in FIG. 24, is used for transmission of specific control signals in the broadcast preamble in this broadband burst and in the section of BCH and FCH. In the sections not used for transmission of specific control signals of each MAC frame, the three subcarriers $SC_1$, $SC_2$, and $SC_3$ with the same band width as other carrier may be arranged in the band used for transmission of the subcarrier SCa, so that it is used for information transmission.

In the section for transmission of specific control signals by the wide band subcarrier SCa, it is possible to adopt the coding format, such as correlation detection, which permits simple receiving processing with a less amount of power consumption, so as to transmit control signals, as mentioned earlier.

The advantage of the constitution to transmit specific control signals by means of the wide band subcarrier SCa, as shown in FIGS. 24 and 25, is that the terminal station can easily receive the specific control signals transmitted by means of the subcarrier SCa and also receives them satisfactorily without erroneous detection in a simple manner with a less amount of power consumption. However, in the case shown in FIGS. 24 and 25, orthogonality with other subcarriers is lost. In addition, it is necessary to pay attention to the transmitting power of the subcarrier SCa so that the transmission characteristics of the data transmitted by using other subcarriers will not deteriorate.

The third embodiment of the present invention will be illustrated below by example with reference to FIGS. 26 to 28.

As in the first and second embodiments, this embodiment is so constructed as to exchange wirelessly OFDM-modulated signals between the base station and the terminal station. It is identical with the first and second embodiments in the fundamental construction for information transmission. It differs from them in that transmission from the base station of specific control signals, such as signals to call the terminal station, is performed at the timing exclusively prepared in the MAC frame.

In the first and second embodiments explained above, transmission of specific control signals is carried out by means of a previously determined narrow-band carrier or a specific subcarrier. By contrast, in this embodiment, transmission for specific signals is carried out by means of an exclusively prepared section.

As mentioned earlier in the first embodiment, one MAC frame consists of four parts: broadcast burst, down-link phase, up-link phase, and contention phase. In this embodiment, however, an exclusive section for calling signals is placed at the end of one MAC frame. As shown in FIG. 28, one MAC frame is composed of broadcast burst (BCH, FCH, and ACH) for transmission of control signals from the base station, down-link phase (DL phase) to be used for transmission of information signals from the base station to the terminal station, up-link phase (UL phase) to be used for transmission of information signals from the terminal station to the base station, and contention phase (including RCH) to be used for calling from the terminal station. This construction is the same as that explained in the first embodiment.

Figure 28:
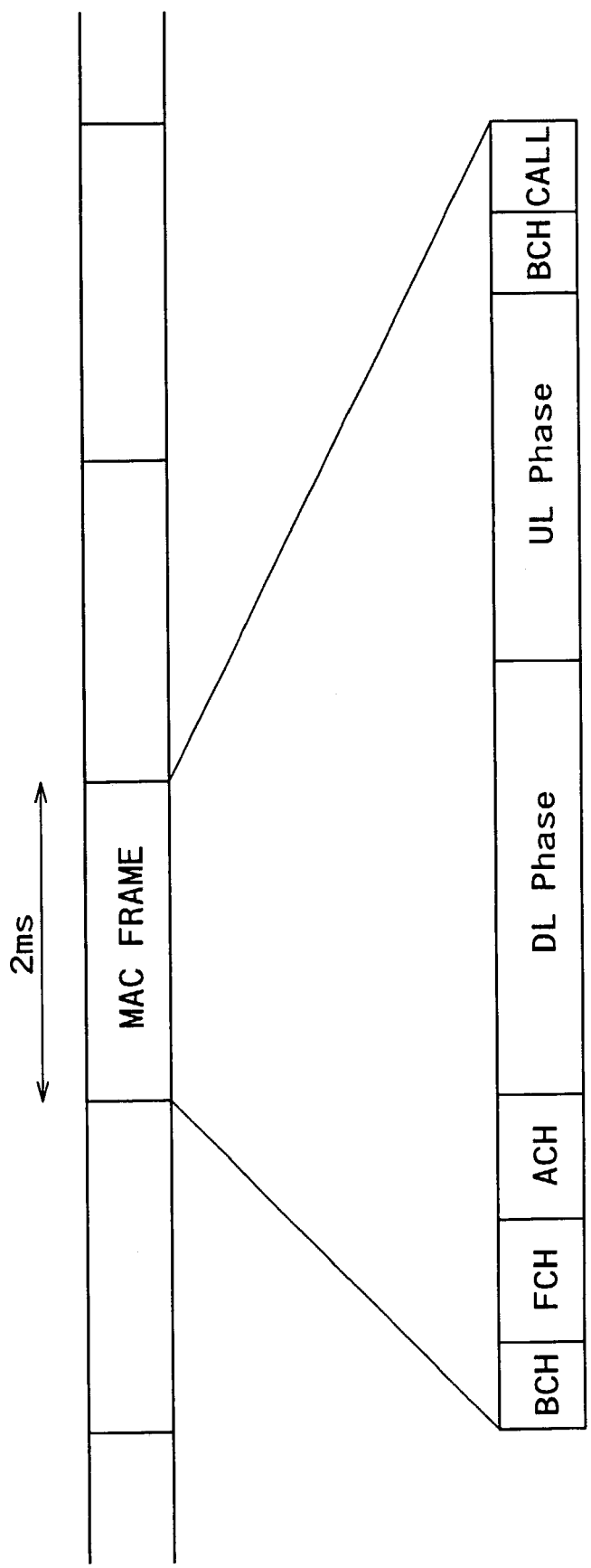
FIG. 28 is a diagram illustrating an example of the frame construction according to the third embodiment of the present invention.

In this embodiment, as shown in FIG. 28, a section for transmission of calling signals is placed after RCH of contention phase in one MAC frame and signals to call each terminal station from the base station are transmitted in this section for calling signals. Incidentally, this section for calling signals may use the period (not used for communication) which is placed at the end of the previously proposed frame construction.

In this section for transmission of calling signals, the base station may transmit OFDM-modulated multi-carrier signals which are signals modulated in the same way as for signals arranged in other sections in one MAC frame. It is also possible to transmit signals that permit simple processing in the terminal station which receives them.

For example, the signals to be transmitted in the section for transmission of calling signals may be those having a low clock frequency. The signals with a low clock frequency may be generated by M-ary coding (explained above with reference to FIG. 11 in the first embodiment) or by coding to repeat transmission even times (as explained above with reference to FIG. 13). In either cases, modulated signals (which differ from OFDM-modulated signals and permit reception by a comparatively simple receiving processing) are transmitted wirelessly in the section for transmission of calling signals.

Figure 26:
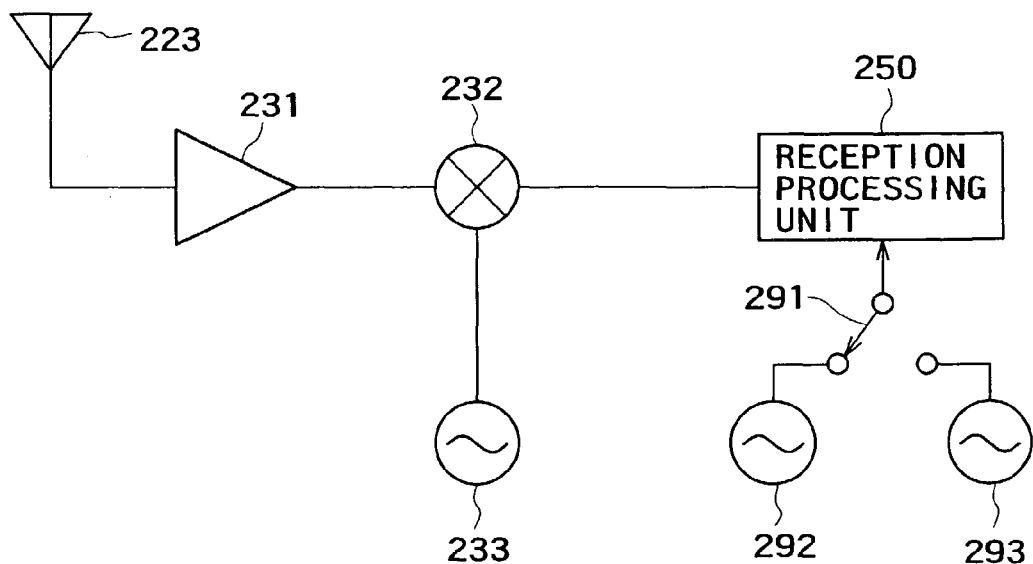
FIG. 26 is a block diagram showing an example of the constitution in which the clock frequency is changed in the terminal station according to the third embodiment of the present invention.
Figure 27:
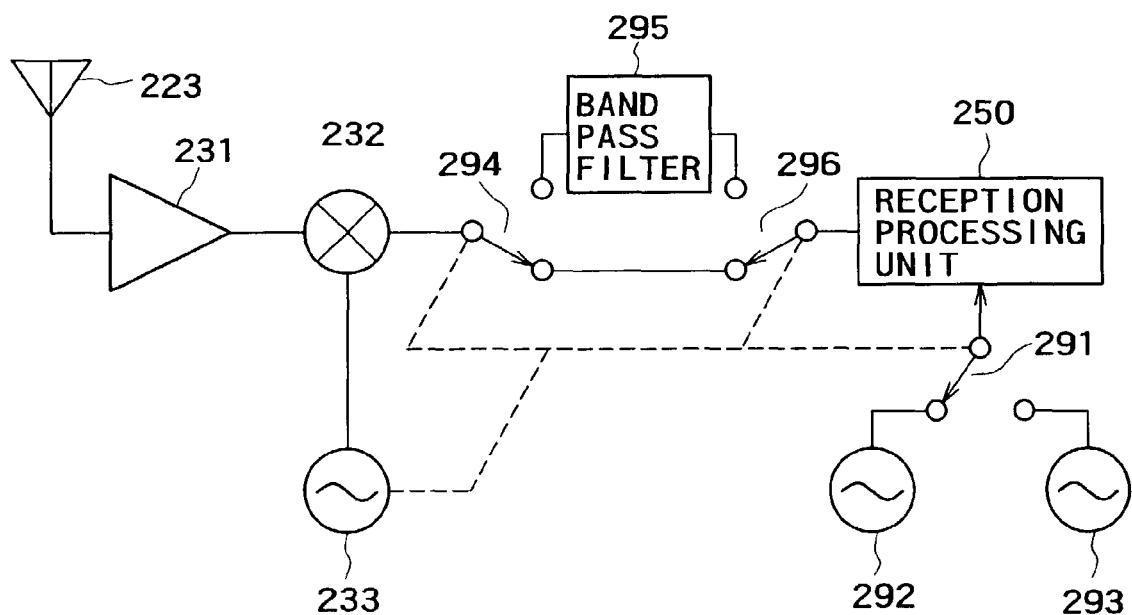
FIG. 27 is a block diagram showing an example of the constitution in which the clock frequency and filter are changed in the terminal station according to the third embodiment of the present invention.

In this case, the terminal station may be constructed as shown in FIG. 26. FIG. 26 is a diagram illustrating how clock is supplied to the receiving system of the terminal station. The signal received by the antenna 223 is amplified by the RD amplifier 231. The amplified output is mixed with the sinusoidal wave generated by the frequency synthesizer 233 in the quadrature detector 232. The received signal of specific transmission frequency is taken out, and it is supplied to the reception processing unit 250, in which reception processing (such as demodulation of received signal) is accomplished. Clock is supplied to the reception processing unit 250 in such a way that the output of the fundamental clock generator 292 and the output of the low-frequency generator 292 (whose frequency is lower than that of the fundamental clock) are selectively supplied through the change-over switch 291. Alternatively, it is also possible to generate low-frequency clock by dividing the output from the fundamental clock generator 292 by means of a frequency divider, instead of installing the low-frequency clock generator 293.

At the time of ordinary reception, the reception processing unit 250 performs reception processing by using the output from the fundamental clock generator 292, and the at the time of stand-by in the terminal station, the reception processing unit 250 performs reception processing by using the output from the low-frequency clock generator. All that is basically necessary at the time of stand-by reception is to receive intermittently only the section in which calling signals are being transmitted as shown in FIG. 28. Another possible alternative is to receive only once in several frames.

Other constitutions in the terminal station and base station may be the same as those explained in the first and second embodiments. Therefore, their description is omitted here.

The advantage of the above-mentioned constitution for stand-by reception at the terminal station is that it is possible to effectively reduce electric power required for stand-by reception at the terminal station. In the case of this embodiment, the section for transmission of calling signal has no effect on transmission of other OFDM-modulated signal because no transmission is made for OFDM-modulated signals; therefore, there is a possibility that calling signals can be transmitted under better conditions than other embodiments mentioned earlier. In addition, the frequency to be transmitted wirelessly is exactly the same in both the section for transmission of calling signals and other sections. The frequency step generated by the frequency synthesizer 233 is exactly the same as the conventional one; therefore, there is no need for change and the constitution of the terminal station does not become complex.

Incidentally, in the case where the band for signal transmission in the section for transmission of calling signal is narrower than the band for signals to be transmitted in other sections, the constitution may be modified such that received signals are passed through a band pass filter at the time of reception of calling signals. That is, as shown in FIG. 27, the constitution is modified such that any of two systems can be selected, one system supplying the output from the quadrature detector 232 (in which the output from the RF amplifier 231 is mixed with the output from the frequency synthesizer 233) to the change-over switch 294 and causing it to pass through the band pass filter 295, and the other system not causing it to pass the filter. The output that has passed through the band pass filter 295 and the output that has not passed through the filter are selected by the change-over switch 296 and then entered the reception processing unit 250. The band pass filter 295 is a filter to extract the band for transmission of calling signals transmitted in the section for transmission of calling signals. It is constructed such that the output from the fundamental clock generator 292 and the output from the low-frequency clock generator 293 are selectively supplied as clock to the reception processing unit 250 through the change-over switch 291.

The switching of each change-over switch 291, 294, and 296 is accomplished by control from the control unit interlinking with the receiving state in the terminal station. That is, in the case where calling signal from the base station is received while the terminal station is in the stand-by state, the change-over switch 291 to select clock is flipped to the side for the low-frequency clock generator 293 and the change-over switches 194 and 196 to select use or non-use of the filter are flipped to the side for use of the band pass filter 295. In the case of ordinary stand-by state for information transmission by the terminal station, the change-over switch 291 to select clock is flipped to the side for the fundamental clock generator 292 and the change-over switches 294 and 296 to select use or non-use of the filter are flipped to the side for non-use of the band pass filter 295. Incidentally, in the case where the frequency for transmission of calling signal to be transmitted in the section for transmission of calling signal differs from the frequency to be transmitted from the base station for information transmission, it is necessary that the output frequency of the frequency synthesizer 233 should be changed with interlocking.

Constructing the terminal station as mentioned above permits one to easily cope with change in clock frequency as well as change in transmission band.

The embodiments mentioned above are based on those examples applicable to the radio communication system called HiSWANa. They are also applicable to other radio communication systems which employ other OFDM modulation schemes. In this case, it is necessary to properly change the number of subcarriers constituting one unit of OFDM-modulated signal or the arrangement of frequencies.

In the above-mentioned embodiments, the calling signal (or part thereof) of the terminal station is arranged as specific control signals to be transmitted by means of the narrow-band carrier or specific subcarrier. It is also possible to arrange other specific control signals for radio transmission.

In the first embodiment mentioned above, the terminal station is constructed such that the filter and AD converter to receive specific control signals transmitted by means of the narrow-band carrier are separate from the filter and AD converter to receive all signals in one transmission band at the time of ordinary reception. In the second embodiment, the filter and AD converter are variable ones so that they can be used in common. These constitution of the terminal station may be applied to other embodiments. In the third embodiment, too, the same constitution as in the first and second embodiments may be applied to the filter and AD converter.

In the above-mentioned embodiments, the circuit to transmit or receive specific control signals such as calling signals is built in the base station and terminal station which perform radio communication by means of OFDM modulation scheme. This circuit may be replaced by a control program (as software) which is installed in the base station and terminal station to execute transmission and reception in the same way as above. In this case, the control program may be stored (recorded) in an appropriate medium such as disk and tape, which is distributed to the company which operates the base station or the user who owns the terminal station. Alternatively, it may be distributed through an appropriate medium such as Internet.

EFFECT OF THE INVENTION

According to the first aspect of the present invention, radio communication between the base station and the terminal station by the communication system with OFDM modulation scheme is accomplished in such a way that all that is necessary for the terminal station to receive part of control signals is to receive only the narrow-band carrier separately from multi-carrier signals. Therefore, there is no need for the terminal station to receive multi-carrier signals, which impose a large load on the reception processing system, when the terminal station receives only part of control signals. This contributes to power saving (hence extended battery life) while the terminal station is not performing data transmission and reception. The terminal station can keep the frame timing for data transmission and reception while it is receiving narrow-band signals. This permits the terminal station in a sleep state to resume data transmission and reception immediately.

In this case, the fact that the band width of the narrow-band carrier is a submultiple of the symbol rate or sample rate applied to the signal band for information communication makes it possible to perform in a simple manner the processing for transmission and reception of the narrow-band carrier.

The fact that part of the control signals addressed to the terminal station which is transmitted from the base station by using the narrow-band carrier is made the signal (or part thereof) to call the terminal station permits the terminal station in the stand-by state to receive calling signals from the base station efficiently with a less amount of power consumption.

The fact that the narrow-band carrier to transmit part of the control signals addressed to the terminal station which is transmitted from the base station is positioned at the center of the guard band of the multi-carrier signal for information transmission permits the multi-carrier signals for information transmission and the narrow-band carrier to be arranged at constant frequency intervals and also makes it possible to establish in a simple manner the frequency for transmission from the base station and the frequency for reception by the terminals station.

The fact that the narrow-band carrier to transmit part of the control signals addressed to the terminal station which is transmitted from the base station is positioned next to the subcarrier constituting the multi-carrier for information transmission makes it possible to transmit or receive the narrow-band carrier by the common processing to transmit or receive the subcarrier in the multi-carrier signal, thereby simplifying the processing in the base station and the terminal station.

The fact that the base station transmits, in synchronism with the frame position for information transmission, part of the control signals addressed to the terminal station which is transmitted by means of the narrow-band carrier permits the terminal station to perform synchronized capture of multi-carrier signals for information transmission simply by receiving the narrow-band carrier, thereby making it possible for the terminal station to rapidly rise from the stand-by state.

The fact that the base station transmits, in the coded form which does not need to estimate the transmission line, part of the control signals addressed to the terminal station which is transmitted by means of the narrow-band carrier makes it possible for the terminal station to perform the simple reception processing which does not need to estimate the transmission line of the received signals when the terminal station has received the narrow-band carrier.

According to the second aspect of the present invention, radio communication between the base station and the terminal station by the communication system with OFDM modulation scheme is accomplished in such a way that all that is necessary for the terminal station to receive part of control signals is to receive only part of the subcarriers in the multi-carrier signals. Therefore, there is no need for the terminal station to receive multi-carrier signals, which impose a large load on the reception processing system, when the terminal station receives only part of control signals. This contributes to power saving (hence extended battery life) while the terminal station is not performing data transmission and reception. The terminal station can keep the frame timing for data transmission and reception while it is receiving specific subcarriers. This permits the terminal station in a sleep state to resume data transmission and reception immediately.

In this case, the fact that part of the control signals addressed to the terminal station which is transmitted from the base station by using specific subcarriers is made the signal (or part thereof) to call the terminal station permits the terminal station to perform the stand-by processing for call from the base station efficiently with a less amount of power consumption.

The fact that the specific subcarrier employs an odd number of subcarriers, with the DC subcarrier at the center, in the equivalent fundamental band of the multi-carrier signal permits the terminal station to receive only specific subcarriers in a simple manner by executing the processing to receive an odd number of subcarriers, with the DC subcarrier at the center.

The fact that the specific subcarrier uses one DC subcarrier in the equivalent fundamental band of the multi-carrier signal permits the terminal station to effectively utilize the subcarrier, thereby executing transmission of control signal (such as calling of the terminal station) in the case of the system in which DC subcarrier in the equivalent fundamental band is not used for information transmission.

The fact that the specific subcarrier uses one subcarrier that occupies the band of a plurality of subcarriers, with the DC subcarrier at the center, permits the specific control signal to be transmitted with larger electric power than the subcarrier for information transmission, with the result that the terminal station can receive it easily.

The fact that the base station transmits, in synchronism with the frame position for information transmission, part of the control signals addressed to the terminal station which is transmitted by means of the specific carrier permits the terminal station to capture the framing timing simply by receiving the specific subcarrier.

The fact that the base station transmits, in the coded form which does not need to estimate the transmission line, part of the control signals addressed to the terminal station which is transmitted by means of the specific subcarrier makes it possible for the terminal station to perform the simple reception processing which does not need to estimate the transmission line of the received signals when the terminal station has received the specific subcarrier.

The fact that the signal transmitted from the base station by means of the specific subcarrier is the signal in which the same data is transmitted repeatedly even times and half the transmission made even times are codes in which the polarity of the code constituting data is inverted permits the receiving side to remove DC offset easily for the signal transmitted by means of the specific subcarrier, thereby permitting part of the transmitted control signal to be received accurately.

According to the third aspect of the present invention, when information exchange is performed at the frame period between the base station and the terminal station by means of the multi-carrier signals based on OFDM modulation scheme, that all that is necessary for the terminal station to receive part of control signals is to receive the specific frame position when the terminal station receives part of the control signals. Therefore, there is no need for the terminal station to receive alls the signals in the frame period when the terminal station receives only part of the control signals. This contributes to power saving (hence extended battery life) while the terminal station is not performing data transmission and reception. The terminal station can keep the frame timing for data transmission and reception while it is receiving only the specific frame position. This permits the terminal station in a sleep state to resume data transmission and reception immediately.

In this case, the fact that part of the control signals addressed to the terminal station which is transmitted from the base station is made the signal (or part thereof) to call the terminal station permits the terminal station to perform the stand-by processing for call from the base station efficiently with a less amount of power consumption.

The signal transmitted from the base station at a specific position has its number of subcarriers reduced so that the frequency band width is reduced. As the result, all that is necessary for the terminal station is to receive the reduced number of subcarriers for reception of the specific frame position. In the case of receiving the specific frame position, all that is necessary is the simple reception processing, which leads to efficient reception.

The fact that the base station transmits, in the coded form which does not need to estimate the transmission line, part of the control signals addressed to the terminal station which is transmitted by means of the specific position makes it possible for the terminal station to perform the simple reception processing which does not need to estimate the transmission line of the received signals when the terminal station has received the signal for the specific position.

What is claimed is:

1. A radio communication method for exchanging information between a base station and a terminal station, the method comprising:
communicating the information between the base station and the terminal station by multi-carrier signals, by OFDM modulation scheme, including plural subcarriers within a bandwidth;
communicating control signals in addition to the information between the base station and the terminal station,
wherein part of the control signals addressed to the terminal station from the base station is transmitted by one or more specific subcarriers in the bandwidth for the multi-carrier signals,
wherein the one or more specific subcarriers is one subcarrier which occupies the band of a plurality of subcarriers which have their center at DC subcarrier in the equivalent base band.

2. The radio communication method as defined in claim 1, wherein the one or more specific subcarriers are an odd number of subcarriers which have their center at DC subcarrier in the equivalent base band.

3. The radio communication method as defined in claim 2, wherein the one or more specific subcarriers is one DC subcarrier in the equivalent base band.

4. The radio communication method as defined in claim 1, wherein the base station transmits part of the control signals addressed to the terminal station, which is transmitted by the one or more specific subcarriers, in synchronism with the frame position for information transmission.

5. The radio communication method as defined in claim 1, wherein the base station transmits part of the control signals addressed to the terminal station, which is transmitted by the specific subcarrier, in a code format.

6. A radio communication method for exchanging information between a base station and a terminal station, the method comprising:
communicating the information between the base station and the terminal station with a frame period by multi-carrier signals, by OFDM modulation scheme, including plural subcarriers within a bandwidth;
communicating control signals in addition to the information between the base station and the terminal station,
wherein part of the control signals addressed to the terminal station from the base station is transmitted by one or more specific subcarriers in the bandwidth for the multi-carrier signals,
wherein the one or more specific subcarriers is one subcarrier which occupies the band of a plurality of subcarriers which have their center at DC subcarrier in the equivalent base band.

7. The radio communication method as defined in claim 6, wherein the base station transmits the part of the control signals addressed to the terminal station, which is transmitted by the specific position, in a code format.

8. A non-transitory computer readable storage medium storing computer executable instructions to be applied to a radio communication system for exchanging information between a base station and a terminal station, comprising:
computer executable instruction causing communicating the information between the base station and the terminal station by multi-carrier signals by OFDM modulation scheme including plural subcarriers within a bandwidth, and communicating control signals in addition to the information between the base station and the terminal station,
wherein in the base station, information to be transmitted is modulated by the OFDM modulation scheme, so that multi-carrier signals addressed to the terminal station are generated, part of the control signals addressed to the terminal station is modulated by one or more specific subcarriers in the band of the multi-carrier signal, and the modulated signals are transmitted,
wherein the one or more specific subcarriers is one subcarrier which occupies the band of a plurality of subcarriers which have their center at DC subcarrier in the equivalent base band.

9. A radio communication method for exchanging information between a base station and a terminal station, the method comprising:
communicating the information between the base station and the terminal station by multi-carrier signals, by OFDM modulation scheme, including plural subcarriers within a bandwidth;
communicating control signals in addition to the information between the base station and the terminal station,
wherein part of the control signals addressed to the terminal station from the base station is transmitted by one or more specific subcarriers in the bandwidth for the multi-carrier signals,
wherein the information to be transmitted from the base station by the specific subcarrier requires the same data to be transmitted repeatedly an even number of times, with more than half the repeated transmissions being composed of said data whose polarity of sign is inverted.

10. The radio communication method as defined in claim 9, wherein the one or more specific subcarriers are an odd number of subcarriers which have their center at DC subcarrier in the equivalent base band.

11. The radio communication method as defined in claim 9, wherein the one or more specific subcarriers is one DC subcarrier in the equivalent base band.

12. The radio communication method as defined in claim 9, wherein the one or more specific subcarriers is one subcarrier which occupies the band of a plurality of subcarriers which have their center at DC subcarrier in the equivalent base band.

13. The radio communication method as defined in claim 9, wherein the base station transmits part of the control signals addressed to the terminal station, which is transmitted by the one or more specific subcarriers, in synchronism with the frame position for information transmission.

14. The radio communication method as defined in claim 9, wherein the base station transmits part of the control signals addressed to the terminal station, which is transmitted by the specific subcarrier, in a code format.

15. A radio communication method for exchanging information between a base station and a terminal station, the method comprising:
communicating the information between the base station and the terminal station with a frame period by multi-carrier signals, by OFDM modulation scheme, including plural subcarriers within a bandwidth;
communicating control signals in addition to the information between the base station and the terminal station,
wherein part of the control signals addressed to the terminal station from the base station is transmitted by one or more specific subcarriers in the bandwidth for the multi-carrier signals,
wherein the information to be transmitted from the base station by the specific subcarrier requires the same data to be transmitted repeatedly an even number of times, with more than half the repeated transmissions being composed of said data whose polarity of sign is inverted.

16. The radio communication method as defined in claim 14, wherein the base station transmits the part of the control signals addressed to the terminal station, which is transmitted by the specific position, in a code format.

17. A non-transitory computer readable storage medium storing computer executable instructions to be applied to a radio communication system for exchanging information between a base station and a terminal station, comprising:

computer executable instruction causing communicating the information between the base station and the terminal station by multi-carrier signals by OFDM modulation scheme including plural subcarriers within a bandwidth, and communicating control signals in addition to the information between the base station and the terminal station, wherein in the base station, information to be transmitted is modulated by the OFDM modulation scheme, so that multi-carrier signals addressed to the terminal station are generated, part of the control signals addressed to the terminal station is modulated by one or more specific subcarriers in the band of the multi-carrier signal, and the modulated signals are transmitted, wherein the information to be transmitted from the base station by the specific subcarrier requires the same data to be transmitted repeatedly an even number of times, with more than half the repeated transmissions being composed of said data whose polarity of sign is inverted.

* * * * *